(12) United States Patent
Sawashima et al.

(10) Patent No.: US 11,513,463 B2
(45) Date of Patent: Nov. 29, 2022

(54) IMAGE FORMING APPARATUS AND CARTRIDGE THAT INCLUDE LIGHT GUIDE THAT GUIDES LIGHT

(71) Applicant: CANON KABUSHIKI KAISHA, Tokyo (JP)

(72) Inventors: Fumiya Sawashima, Tokyo (JP); Takeo Kawanami, Kamakura (JP)

(73) Assignee: Cation Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/023,113

(22) Filed: Sep. 16, 2020

(65) Prior Publication Data
US 2021/0096479 A1 Apr. 1, 2021

(30) Foreign Application Priority Data
Sep. 26, 2019 (JP) ............................. JP2019-175901

(51) Int. Cl.
*G03G 21/08* (2006.01)
*G03G 15/04* (2006.01)
*G03G 15/16* (2006.01)
*G03G 15/043* (2006.01)
*G03G 15/045* (2006.01)
*G03G 21/00* (2006.01)
*F21V 8/00* (2006.01)

(52) U.S. Cl.
CPC ........... *G03G 21/08* (2013.01); *G02B 6/0096* (2013.01); *G03G 15/043* (2013.01); *G03G 15/045* (2013.01); *G03G 15/0409* (2013.01); *G03G 15/1685* (2013.01); *G03G 21/00* (2013.01)

(58) Field of Classification Search
CPC ............. G03G 15/0409; G03G 15/043; G03G 15/045; G03G 21/08
See application file for complete search history.

(56) References Cited

U.S. PATENT DOCUMENTS

2001/0031149 A1* 10/2001 Shimizu ............. G03G 15/0216
399/50
2002/0081126 A1* 6/2002 Yokomori .......... G03G 21/1814
399/118

(Continued)

FOREIGN PATENT DOCUMENTS

JP 2009169200 A 7/2009
JP 2011227425 A 11/2011

(Continued)

*Primary Examiner* — Benjamin R Schmitt
(74) *Attorney, Agent, or Firm* — Canon U.S.A., Inc. I.P. Division

(57) ABSTRACT

A charge removing unit emits light onto a surface of an image bearing member for removing charge on the surface. The charge removing unit includes a light source configured to emit the light, and a light guide that is configured to guide the light to irradiate the surface of the image bearing member with the light and has a cylindrical shape extending in an axial direction of the image bearing member. At both ends in a longitudinal direction of the light guide, one end portion and another end portion are respectively provided. The light is introduced to the one end portion. The another end portion includes an inclined surface inclining in a direction from the one end portion to the another end portion, toward a central axis of a circumference of the light guide.

32 Claims, 20 Drawing Sheets

(56) References Cited

U.S. PATENT DOCUMENTS

| | | | | |
|---|---|---|---|---|
| 2002/0172530 | A1* | 11/2002 | Kido | G03G 21/08 |
| | | | | 399/128 |
| 2003/0210557 | A1* | 11/2003 | Wu | H04N 1/0284 |
| | | | | 362/555 |
| 2006/0060751 | A1* | 3/2006 | Nishimura | G03G 21/08 |
| | | | | 250/208.1 |
| 2010/0080623 | A1* | 4/2010 | Tanaka | G03G 21/08 |
| | | | | 399/118 |
| 2010/0183333 | A1* | 7/2010 | Kim | G03G 21/08 |
| | | | | 399/168 |
| 2015/0277359 | A1* | 10/2015 | Abe | G03G 21/06 |
| | | | | 399/128 |
| 2017/0075248 | A1* | 3/2017 | Tokudome | G03G 15/0216 |
| 2017/0199479 | A1* | 7/2017 | Tanaka | G02B 6/001 |

FOREIGN PATENT DOCUMENTS

| | | |
|---|---|---|
| JP | 2017058433 A | 3/2017 |
| JP | 2018132743 A | 8/2018 |

* cited by examiner

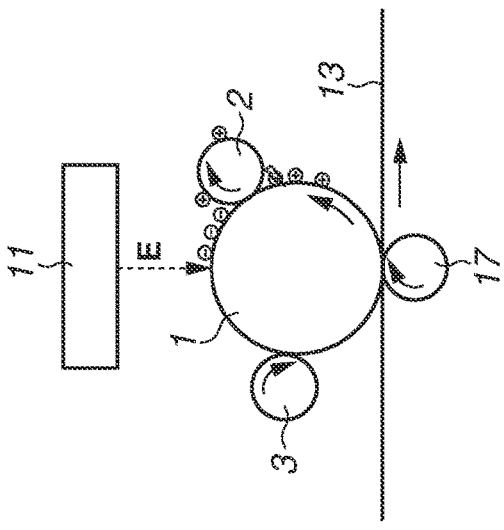
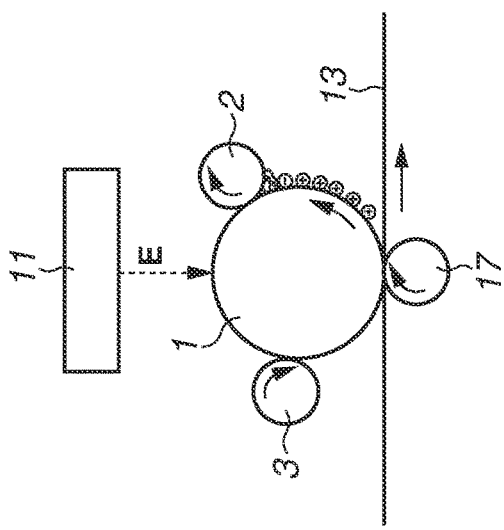
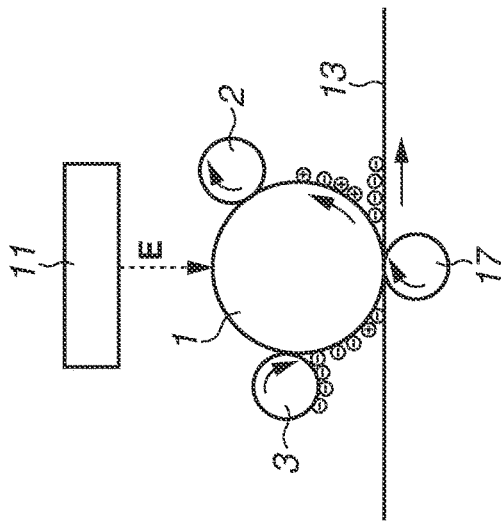
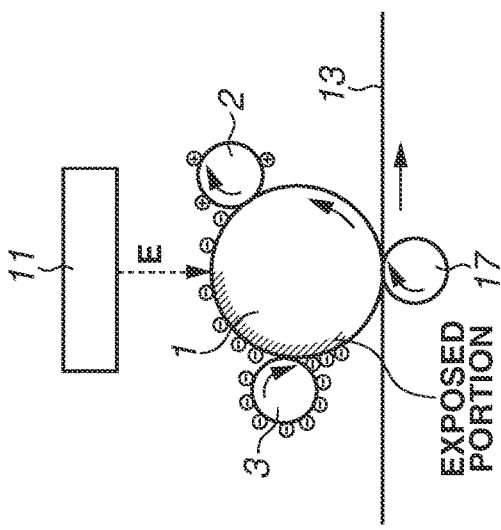
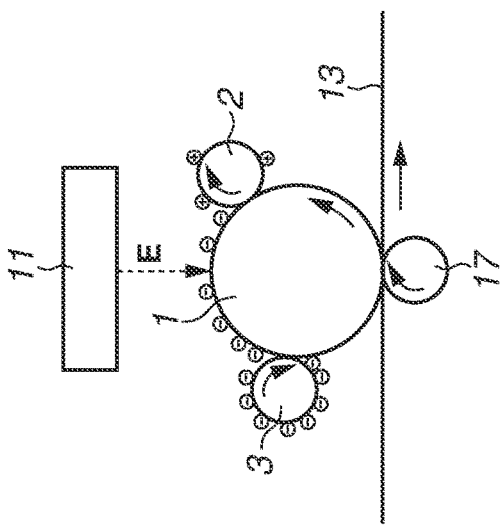

FIG.20

TABLE 1

| | SURFACE LIGHT AMOUNT OF PHOTOSENSITIVE DRUM ANOTHER END PORTION/ ONE END PORTION (%) | GHOST | |
|---|---|---|---|
| | | ONE END PORTION (NON-DRIVE SIDE, LIGHT SOURCE SIDE) | ANOTHER END PORTION (DRIVE SIDE, NON-LIGHT SOURCE SIDE) |
| FIRST EXEMPLARY EMBODIMENT | 71.6 | ○ | ○ |
| COMPARATIVE EXAMPLE 1 | 42.4 | ○ | × |

IMAGE FORMING APPARATUS AND CARTRIDGE THAT INCLUDE LIGHT GUIDE THAT GUIDES LIGHT

BACKGROUND

Field of the Disclosure

The present disclosure relates to an image forming apparatus and an image forming system. The image forming apparatus forms an image onto a recording material (recording medium) using an electrophotographic image forming method. Examples of the image forming apparatus include a copying machine, a printer (laser beam printer, light-emitting diode (LED) printer, etc.), a facsimile device, a word processor, and a multifunction peripheral (multifunction printer) including functions of these devices.

Description of the Related Art

By uniformly charging a photosensitive drum serving as an image bearing member to a desired potential by the discharge with a charging member, and then performing exposure in accordance with an image pattern, an image forming apparatus forms an electrostatic latent image onto the photosensitive drum. After that, the image forming apparatus visualizes the electrostatic latent image on the photosensitive drum by developing the electrostatic latent image with toner, and transfers the visualized image onto a recording material such as paper.

If residual charge remains on the surface of the photosensitive drum when the surface of the photosensitive drum is charged, a surface potential of the photosensitive drum becomes nonuniform in some cases. As a result, an image defect called a drum ghost is sometimes generated due to a potential difference between an image-formed portion and a non-image-formed portion that are formed on the photosensitive drum. In the image-formed portion, a toner image is formed, and in the non-image-formed portion, a toner image is not formed.

It is therefore known that providing a so-called charge removing member is effective for eliminating a potential difference formed on the surface of a photosensitive drum, as discussed in Japanese Patent Laid-Open No. 2017-58433. The charge removing member removes charge to change the surface potential of the photosensitive drum to a predetermined potential by emitting light onto the photosensitive drum surface not having been subjected to a charging process. The charge removing member will be referred to as a pre-exposure unit. Examples of the configuration of the pre-exposure unit include a configuration in which a light emitting diode (LED) or an LED substrate and a light guiding unit such as a light guide are combined. Although these techniques are useful as a system for removing charge from the entire longitudinal region of the photosensitive drum, in recent years, a configuration of a light guide in which an LED is provided at a longitudinal direction end portion of the photosensitive drum has been often employed from the aspect of cost, rather than providing an LED over the entire longitudinal region of the photosensitive drum.

In Japanese Patent Laid-Open No. 2017-58433, depending on the shape of a light guide used in a pre-exposure unit, and an internal structure of the light guide, an exposure amount in an axial direction of the photosensitive drum becomes nonuniform in some cases. In particular, in the longitudinal direction of the photosensitive drum, at the end portion opposite the end in which light is input, a light amount tends to decline due to light leakage from the end portion. As countermeasures for suppressing a light amount decline at the end portion, there has been employed a configuration of increasing an output of the light source, a configuration of providing a casing at the end portion, or a configuration of providing a cover member to even out the amount of light. However, the adoption of the above-described configuration may cause an increase in power consumption, an increase in the number of components, or the upsizing of an image forming apparatus.

SUMMARY

In view of the above-described situations, aspects of the present disclosure include suppressing a light amount decline at an end portion on the opposite side of an input side of light in a configuration in which a light guide is provided in a pre-exposure unit.

According to a first aspect of the disclosure, an image forming apparatus includes a rotatable image bearing member, and a charge removing unit configured to emit light onto a surface of the image bearing member for removing charge on the surface of the image bearing member, the charge removing unit including a light source configured to emit the light, and a light guide that is configured to guide the light to irradiate the surface of the image bearing member with the light, and has a cylindrical shape extending in an axial direction of the image bearing member, wherein the light guide includes one end portion (light end portion) and another end portion (reflecting end portion) in a longitudinal direction of the light guide, and the one end portion is an end portion to which the light emitted by the light source is introduced, and wherein the another end portion is an end portion on an opposite side of the one end portion in the longitudinal direction of the light guide, and the another end portion includes an inclined surface inclining in a direction from the one end portion to the another end portion, toward a central axis of a circumference of the light guide.

Further features of the present disclosure will become apparent from the following description of exemplary embodiments (with reference to the attached drawings).

BRIEF DESCRIPTION OF THE DRAWINGS

FIGS. 19A to 19E are explanatory diagrams of a cleanerless system according to the second exemplary embodiment.

FIG. 20 is a table illustrating a rate of a surface light amount.

DESCRIPTION OF THE EMBODIMENTS

Hereinafter, exemplary embodiments of the present disclosure will be described in detail with reference to the drawings. The dimensions, materials, shapes, and relative arrangement of the components described in the following exemplary embodiments are to be appropriately changed depending on the configuration of an apparatus to which the present disclosure is applied, and various conditions. Thus, the dimensions, materials, shapes, and relative arrangement are not intended to limit the scope of the present disclosure to those described in the exemplary embodiments unless otherwise specifically stated.

Hereinafter, an image forming apparatus according to an exemplary embodiment of the present disclosure will be described in more detail with reference to the drawings.

1. Image Forming Apparatus

Figure 1:
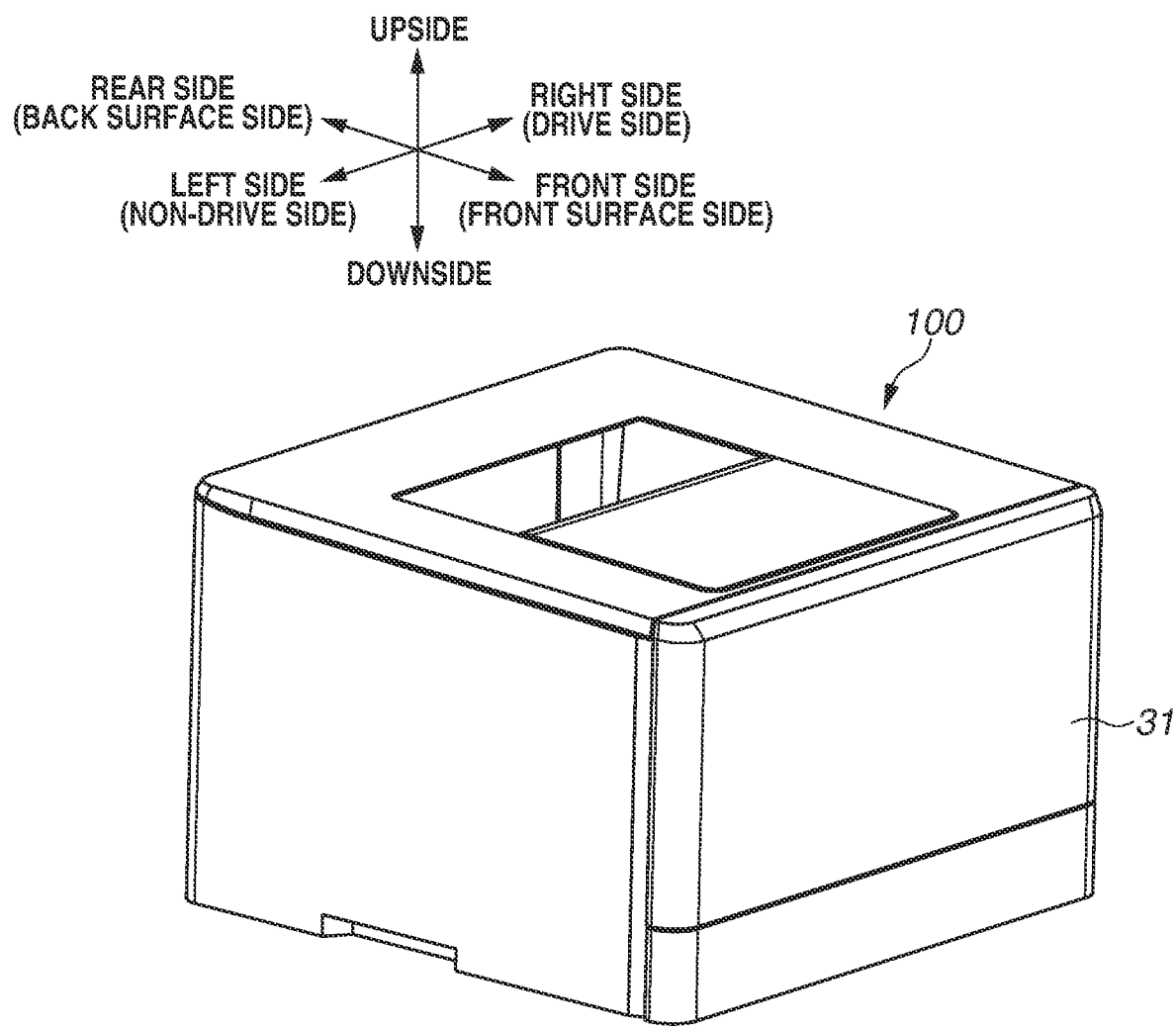
FIG. 1 is an external perspective view of an image forming apparatus according to a first exemplary embodiment.

A schematic configuration of the overall configuration of an image forming apparatus 100 according to a first exemplary embodiment will be described with reference to FIGS. 1 and 2. FIG. 1 is an external perspective view of the image forming apparatus 100, and FIG. 2 is a cross-sectional view of the image forming apparatus 100.

Figure 2:
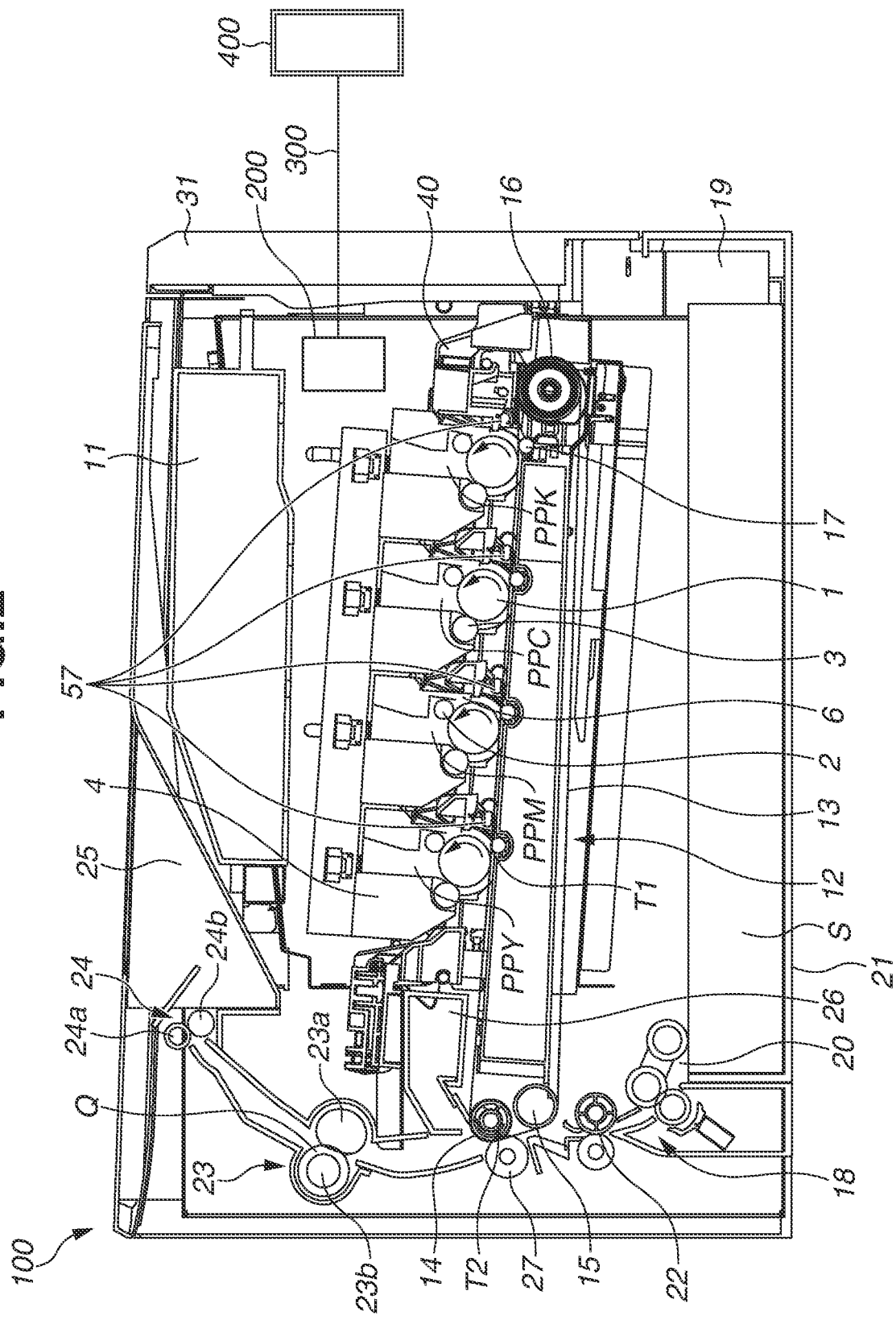
FIG. 2 is a cross-sectional view of the image forming apparatus according to the first exemplary embodiment.

As illustrated in FIG. 2, the image forming apparatus 100 is a four-color full-color printer (electrophotographic image forming apparatus) that uses an electrophotographic process, and includes first to fourth four process cartridges PP (Y, M, C, and K) as a plurality of cartridges. The image forming apparatus 100 can form a full-color or monochrome image onto a sheet-like recording material S based on an electrical image signal that has been output from a controller 400 serving as an external host device, and input to a control unit 200 via an interface unit 300. Examples of the controller 400 include a personal computer, an image reader, a facsimile, and a smartphone. The control unit 200 is a control unit that controls an electrophotographic image forming process of the image forming apparatus 100, and exchanges various types of electrical information with the controller 400. In addition, the control unit 200 controls processing of electrical information input from various process devices and sensors, processing of command signals to various process devices, a predetermined initial sequence, and a sequence of a predetermined electrophotographic image forming process.

In the following description, as illustrated in FIG. 1, a front side (front surface side) of the image forming apparatus 100 is a side on which a front door 31 is arranged. A rear side (back surface side) of the image forming apparatus 100 is an opposite side of the front side. A front-back direction refers to a direction (front direction) heading for the front side from the rear side of the image forming apparatus 100, and a reverse direction (back direction) of the front direction. The left and right refer to the left side and the right side when the image forming apparatus 100 is viewed from the front side. A left-right direction refers to a direction (left direction) heading for the left side from the right side, and a reverse direction (right direction) of the left direction. The up and down refer to an upside and a downside in a gravitational force direction. An upper direction refers to a direction heading for the upside from the downside, and a lower direction refers to a direction heading for the downside from the upside. In addition, a longitudinal direction refers to a direction parallel to a rotational axis direction of an electrophotographic photosensitive drum 1 serving as an image bearing member on which a latent image is to be formed. A widthwise direction is a direction (orthogonal direction) orthogonal to the longitudinal direction. In addition, one end side in the longitudinal direction corresponds to a drive side, and another end side corresponds to a non-drive side.

In the first exemplary embodiment, a right end side in the longitudinal direction corresponds to a drive side, and a left end side corresponds to a non-drive side. In the image forming apparatus 100, from the rear side to the front side of the image forming apparatus 100, the first to fourth four process cartridges PP (Y, M, C, and K) are held in a cartridge tray 40, and are attached to predetermined attachment positions (inline configuration, tandem type). The cartridge tray 40 will be described in detail below.

Image forming stations of four colors are illustrated in FIG. 2, and the image forming stations are stations that form images in yellow, magenta, cyan, and black in order from the left in FIG. 2. The letters "Y", "M", "C", and "K" added to the reference numerals in FIG. 2 respectively indicate that the components are components of the stations that form yellow, magenta, cyan, and black toner images on the surfaces of the photosensitive drums 1 serving as an image bearing member. Hereinafter, the description will be given of one station of the four stations because the configurations of the respective stations that form yellow, magenta, cyan, and black images are similar.

The cylindrical photosensitive drum 1 serves as an image bearing member, and rotates about an axis thereof. After the surface of the photosensitive drum 1 is uniformly charged by a charging roller 2 serving as a contact charging device, a latent image is formed on the surface of the photosensitive drum 1 by an exposure unit 11 serving as an exposure unit. The charging roller 2 includes a core metal and a conductive elastic layer concentrically formed around the core metal, and a charge voltage is applied to the core metal by a charge voltage application unit 71. Toner serving as single-component developer is stored in a development unit DP. Toner having a predetermined charge polarity is supplied by a development roller 3 serving as a toner bearing member and a development member, to an electrostatic latent image on the photosensitive drum 1, and the electrostatic latent image is visualized as a toner image. The development roller 3 includes a core metal and a conductive elastic layer concentrically formed around the core metal, and a development voltage is applied to the core metal by a development voltage application unit 72. The toner image on the photosensitive drum 1 is electrostatically transferred onto an intermediate transfer unit 12 by a primary transfer roller 17 serving as a transfer member to which a transfer voltage is applied by a primary transfer voltage application unit 73. The primary transfer roller 17 has a conductive elastic layer provided on a shaft and is formed into a roller shape, and a voltage is applied to the shaft. The toner images of the respective colors are sequentially transferred onto an intermediate transfer belt (endless belt) 13 serving as an intermediate transfer member being a transfer target material, and a full-color toner image is formed. After that, the full-color toner image is transferred by a secondary transfer roller 27 onto paper S serving as a recording material, fixed onto the recording material S by a fixing device 23 as a permanent image by being thermally melt and mixed in color, and discharged as an image-formed product. An image forming operation will be described in detail below.

Figure 3:
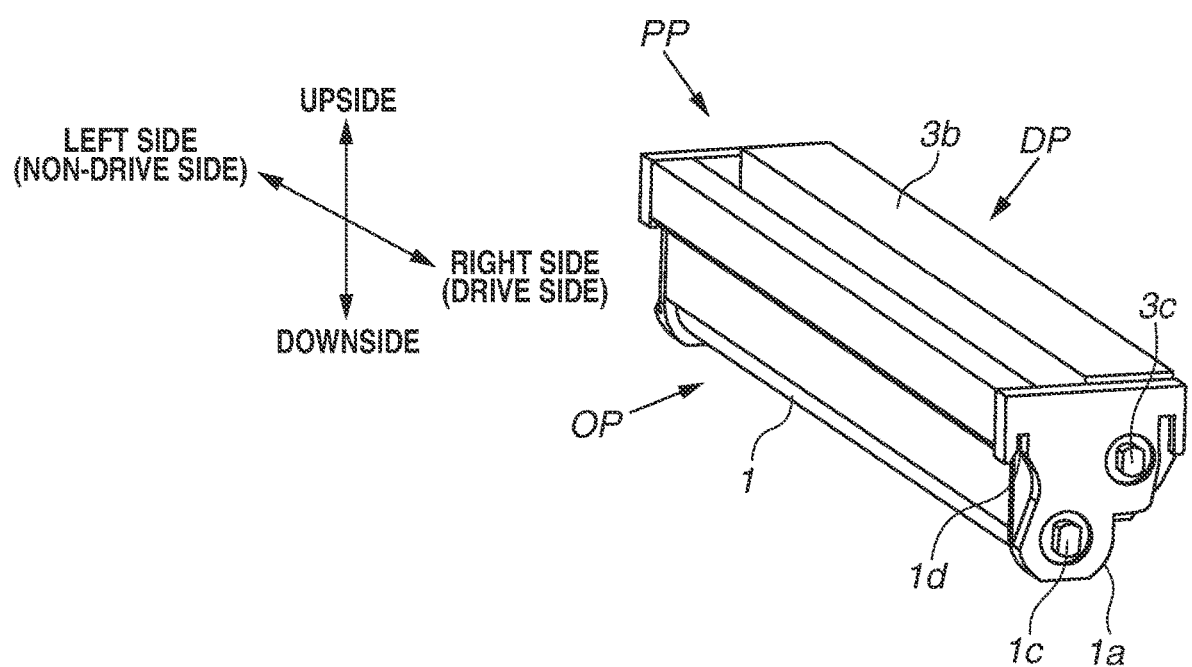
FIG. 3 is a perspective view of a cartridge of the image forming apparatus according to the first exemplary embodiment.

The process cartridge PP will be described with reference to FIG. 3. An attachment position of the process cartridge PP is a position at which an image forming operation can be performed. The process cartridge PP contributes to an image forming process of forming an image onto the recording material S, and is used with being detachably attached to the image forming apparatus 100. As illustrated in FIG. 3, each of the process cartridges PP in the first exemplary embodiment includes a drum unit OP including the photosensitive drum 1 serving as an image bearing member on which a latent image is to be formed, and the development unit DP serving as an electrophotographic image forming process unit acting on the photosensitive drum 1. The drum unit OP includes the photosensitive drum 1, and the charging roller 2 that charges the surface of the photosensitive drum 1. The development unit DP includes a development device 4, and the development device 4 includes the development roller 3 serving as a toner bearing member that supplies toner to the photosensitive drum 1 and develops a latent image as a toner image, and a toner storing unit 3b that stores toner.

The color of stored toner varies for each of the process cartridges PP. More specifically, in the first process cartridge PPY, yellow (Y) toner is stored in the toner storing unit 3b, and a yellow toner image is formed on the surface of the photosensitive drum 1. Subsequently, magenta (M) toner is stored in the second process cartridge PPM, cyan (C) toner is stored in the third process cartridge PPC, and black (K) toner is stored in the fourth process cartridge PPK, and these process cartridges PP form toner images of the respective colors.

Below the process cartridge PP, the primary transfer roller 17 serving as a transfer member is arranged to face the photosensitive drum 1 of each of the drum units OP. A transfer voltage is applied to the primary transfer roller 17 by the primary transfer voltage application unit 73, and a toner image formed on the surface of the photosensitive drum 1 is primarily transferred onto the surface of the endless belt 13 of the intermediate transfer unit 12 that serves as a transfer target material. The intermediate transfer unit 12 includes the flexible endless belt (intermediate transfer belt) 13, and a drive roller 14, an auxiliary roller 15, and a tension roller 16 that stretch and move the intermediate transfer belt 13 in a circulative manner. The drive roller 14 and the auxiliary roller 15 are arranged on the rear side in the image forming apparatus 100. The tension roller 16 is arranged on the front side in the image forming apparatus 100.

In addition, in a state in which each of the process cartridges PP is attached to the predetermined attachment position, the bottom surface of the photosensitive drum 1 is in contact with the intermediate transfer belt 13. On the inside of the intermediate transfer belt 13, the primary transfer roller 17 is arranged to face the photosensitive drum 1. A nip portion being a contact portion between the photosensitive drum 1 and the intermediate transfer belt 13 will be referred to as a primary transfer nip portion T1. The secondary transfer roller 27 is in contact with the drive roller 14 via the intermediate transfer belt 13. A nip portion of the secondary transfer roller 27 and the intermediate transfer belt 13 will be referred to as a secondary transfer nip portion T2.

A feeding unit 18 is arranged on the lower side of the intermediate transfer unit 12. The feeding unit 18 stores the recording material S on which a toner image is to be transferred, and conveys the recording materials S one by one to the intermediate transfer unit 12. The feeding unit 18 includes a feeding tray 19 that stores the stacked recording materials S, feeding rollers 20, an intermediate plate 21, and a registration roller pair 22. The feeding tray 19 can be freely taken in and out (inserted into and drawn out) from the front side of the image forming apparatus 100 (front-loading).

In an upper part on the rear side in the image forming apparatus 100, a fixing device 23 and a discharge roller pair 24 are arranged. The fixing device 23 fixes the toner image transferred on the recording material S by applying heat and pressure to the recording material S, and the discharge roller pair 24 discharges the recording material S on which the toner image is fixed. The fixing device 23 includes a fixing film assembly 23a and a pressure roller 23b, and the discharge roller pair 24 includes a discharge roller 24a and a roller 24b. In addition, a discharge tray 25 is formed on the top surface of the apparatus main body of the image forming apparatus 100.

On the front side of the image forming apparatus 100, the front door 31 rotatably attached to the image forming apparatus 100 is arranged. By opening the front door 31, it becomes possible for a user to access the cartridge tray 40, and by pulling out the cartridge tray 40 toward the front side, it becomes possible to replace each of the process cartridges PP.

2. Control Configuration of Image Forming Apparatus

Figure 4:
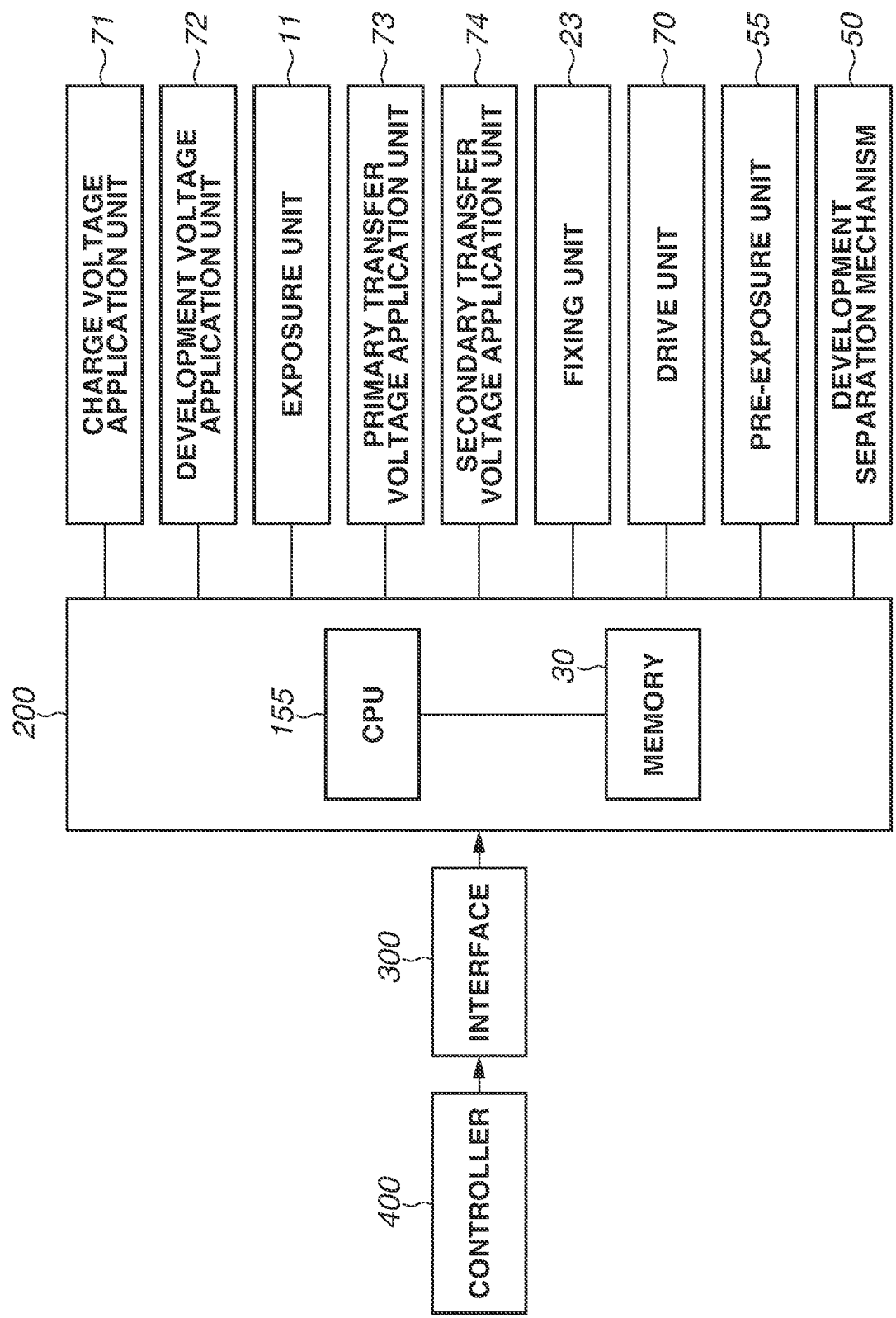
FIG. 4 is a control block diagram according to the first exemplary embodiment.

FIG. 4 is a block diagram schematically illustrating a control configuration of a main part of the image forming apparatus 100 according to the first exemplary embodiment. The control unit 200 is a unit that controls an operation of the image forming apparatus 100, and exchanges various electrical information signals. In addition, the control unit 200 performs processing of electrical information signals input from various process devices and sensors, and processing of command signals to various process devices. The controller 400 exchanges various types of electrical information with a host device, and comprehensively controls an image forming operation of the image forming apparatus 100 in the control unit 200 via the interface unit 300 in accordance with a predetermined control program or a reference table. The control unit 200 may be a control circuit board that includes a central processing unit (CPU) 155 being a central element that performs various types of calculation processing, and a memory 30 such as a random access memory (RAM) or a read-only memory (ROM)

being a storage element. Note that the CPU 155 is a processor circuitry that may have one or more processors, and/or one or more CPU cores, ASIC (application specific integrated circuits) and/or FPGA (field programmable gate array), and/or one or more combinations of them. The RAM stores a detection result of a sensor, a count result of a counter, and a calculation result, and the ROM stores a control program, and a data table obtained in advance by experiment. Each control target in the image forming apparatus 100, a sensor, and a counter are connected to the control unit 200. The control unit 200 controls a predetermined image forming sequence by controlling the exchange of various electrical information signals and timings of the driving of each unit. For example, the control unit 200 controls the following high-voltage power sources and devices for forming a toner image onto the surface of the photosensitive drum 1. The control unit 200 controls the charge voltage application unit 71 serving as a charge power source, the development voltage application unit 72 serving as a development power source, and the exposure unit 11. Furthermore, the control unit 200 controls the primary transfer voltage application unit 73 serving as a primary transfer power source, and the secondary transfer voltage application unit 74 serving as a secondary transfer power source that are provided for forming a toner image onto the recording material S. Aside from these, the control unit 200 controls a drive unit 70 that rotates various rollers, a pre-exposure unit 55 serving as a charge removing unit that removes charge of the surface of the photosensitive drum 1, a development separation mechanism 50 that controls contact and separation of the photosensitive drum 1 and the development roller 3, and the fixing device 23. A specific configuration of the pre-exposure unit 55 will be described in detail below.

3. Image Forming Operation

Next, an operation for forming a full-color image will be described with reference to FIG. 2.

Initially, when a job signal is received from the interface unit 300, the development separation mechanism 50 moves in the front-back direction of the image forming apparatus 100. As illustrated in FIG. 3, in the process cartridge PP, a development coupling 3*c* exists on the drive side of the development roller 3, and the development unit DP is supported to be rotatable about the development coupling 3*c*. By the development unit DP being rotated and moved by the development separation mechanism 50, the development roller 3 and the photosensitive drum 1 come into contact with each other. In addition, a monochrome image forming operation and a full-color image forming operation are different in operation. In the monochrome image forming operation, the development separation mechanism 50 operates to bring only the fourth development roller 3K and the fourth photosensitive drum 1K into contact with each other.

The photosensitive drums 1 of the first to fourth cartridges PY, PM, PC, and PK are driven to rotate at a predetermined control speed in a counterclockwise direction indicated by an arrow illustrated in FIG. 2. The intermediate transfer belt 13 is driven to rotate at a speed corresponding to the speed of the photosensitive drums 1.

In synchronization with the driving, in each of the process cartridges PP, the charging roller 2 uniformly charges the surface of the photosensitive drum 1 at a predetermined polarity and a predetermined potential at a predetermined control timing. In the first exemplary embodiment, the predetermined polarity (regular polarity) is set to a negative polarity. Accordingly, the regular polarity of toner is set to a negative polarity.

Next, the exposure unit 11 irradiates the surface of the photosensitive drum 1 with light and exposes the surface of the photosensitive drum 1 to light in accordance with an image signal of each color. An electrostatic latent image corresponding to an image signal of a corresponding color is thereby formed on the surface of the photosensitive drum 1. The formed latent image is developed by the development roller 3 as a toner image.

By the above-described image forming operation, a yellow toner image corresponding to a Y-color component of a full-color image is formed on the photosensitive drum 1 of the first station. The toner image is primarily transferred onto the intermediate transfer belt 13 at the primary transfer nip portion T1. Subsequently, similarly to the first station, magenta, cyan, and black toner images are primarily transferred onto the intermediate transfer belt 13 at the primary transfer nip portions T1 in the second, third, and fourth stations. In this manner, four-color overlaid unfixed toner images are formed in a combined manner on the surface of the intermediate transfer belt 13.

The toner remaining on the surface of the photosensitive drum 1 without being primarily transferred onto the intermediate transfer belt 13 at the primary transfer nip portion T1 is collected by a cleaning blade (cleaning member) 6 serving as a cleaning device that is in contact with the photosensitive drum 1.

On the other hand, the feeding roller 20 is driven at a predetermined control timing. Accordingly, the feeding roller 20 and the intermediate plate 21 cooperatively separate one of the recording materials S stacked on the feeding tray 19, from the other recording materials S, and feed the one recording material S. The recording material S is introduced to the secondary transfer nip portion T2 by the registration roller pair 22 at a predetermined control timing.

At this time, in a process in which the recording material S is conveyed with being nipped at the secondary transfer nip portion T2, four-color overlaid toner images on the intermediate transfer belt 13 are sequentially and collectively transferred onto the surface of the recording material S. The recording material S is separated from the surface of the intermediate transfer belt 13, introduced to the fixing device 23 through a conveyance path, heated and pressed at a fixing nip portion Q, and the toner image is fixed onto the recording material S.

Then, the recording material S passes through the fixing device 23, and is discharged by the discharge roller pair 24 onto the discharge tray 25 as a full-color image-formed product. The secondary transfer residual toner remaining on the surface of the intermediate transfer belt 13 after the recording material S is separated is removed by a cleaning unit 26 arranged above the intermediate transfer belt 13.

When a job ends, the development separation mechanism 50 operates to separate the photosensitive drum 1 of the drum unit OP and the development roller 3 of the development unit DP, and image formation ends by turning off the driving of various voltage application units.

4. Relationship between Process Cartridge and Cartridge Tray

Figure 5A:
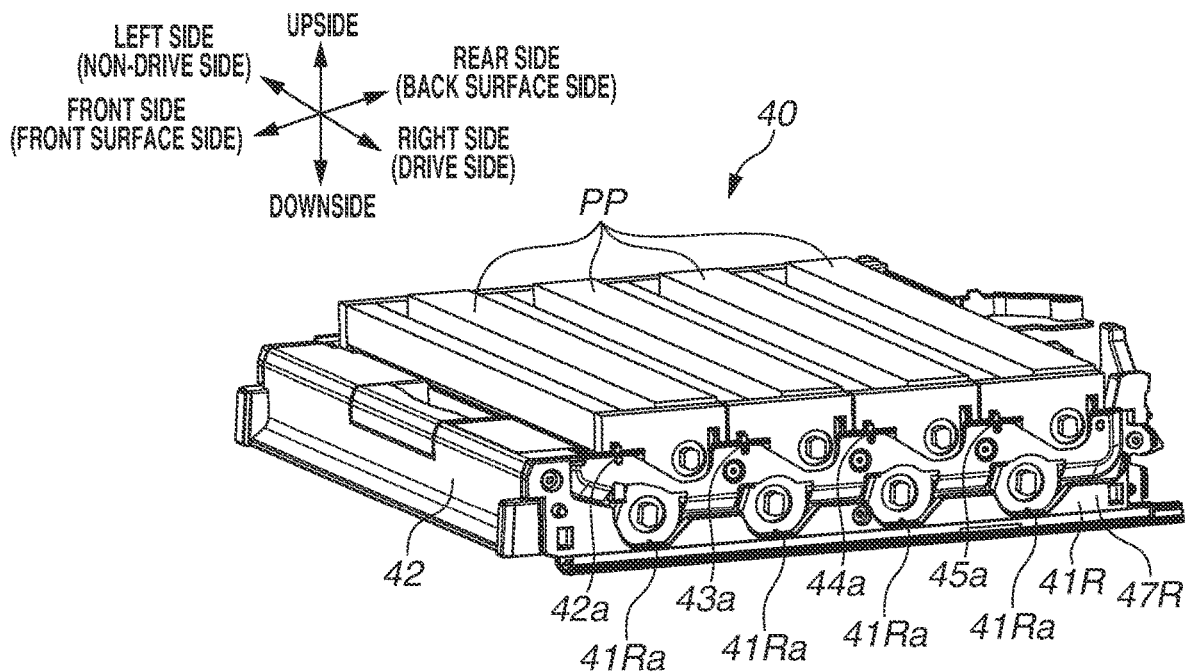
FIGS. 5A and 5B are perspective views of the cartridge and a cartridge tray according to the first exemplary embodiment.
Figure 5B:
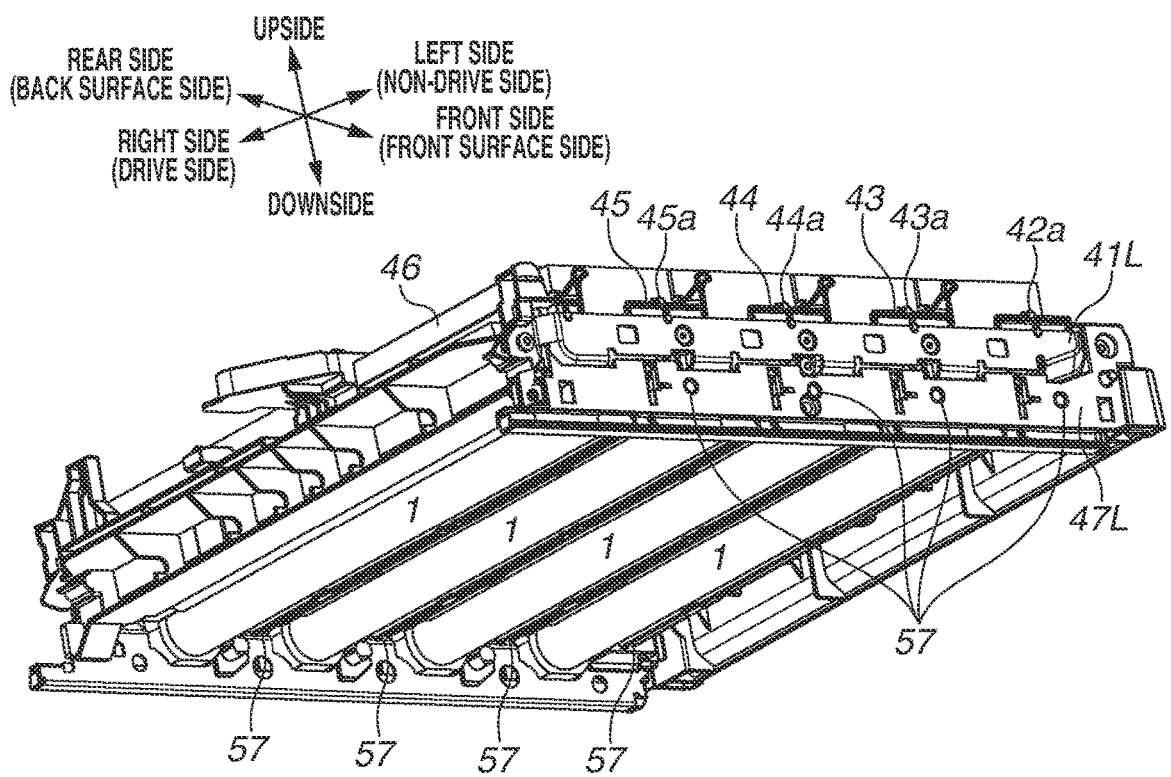

Next, the cartridge tray 40, and a state in which the process cartridge PP is attached to the cartridge tray 40 will be described with reference to FIGS. 3, 5A, and 5B. The cartridge tray 40 is a movable member moving between an internal position and an external position of the image forming apparatus 100 in a state of holding the process cartridges PP, and is provided for facilitating the replacement of the process cartridges PP. The cartridge tray 40 detachably includes the process cartridge PP. FIG. 5A is a perspective view illustrating the cartridge tray 40 to which the process cartridges PP are attached, viewed from the upper right side, and FIG. 5B is a perspective view illustrating the cartridge tray 40 to which the process cartridges PP are attached, viewed from the lower left side. Because the attached states of the process cartridges PP (Y, M, C, and K) of the respective colors are the same, the description will now be given of one process cartridge PP. In a state in which the process cartridge PP is attached to the cartridge tray 40, a drum flange 1a is in contact with an engagement portion 41Ra of the cartridge tray 40. Then, by force being applied in the gravitational force direction by the its own weight or pressing force in the lower direction, the process cartridge PP is positioned with respect to the cartridge tray 40. The engagement portion 41Ra of the cartridge tray 40 has a V-shape, and is designed to have a most appropriate angle to prevent the process cartridge PP from moving during image formation. Specifically, an inclined surface on the front side has an angle of 65° and an inclined surface on the rear side becomes has an angle of 45° with respect to a drawing direction. In addition, a groove portion 1d of the process cartridge PP is fitted with an engagement boss 42a (43a, 44a, 45a) of the cartridge tray 40, and has a function of stopping the rotation of the process cartridge PP. The above description has been given of the drive side. On the non-drive side, the orientation is similarly held by the process cartridge PP being in contact with the cartridge tray 40. Then, the cartridge tray 40 is positioned within the image forming apparatus 100 in a state of holding the process cartridge PP.

The cartridge tray 40 includes tray side panels 41L and 41R including a pair of metals including the engagement portion 41Ra corresponding to each of the process cartridges PP, and five resin coupling members provided between the pair of tray side panels 41L and 41R. The coupling members include a first coupling member 42 including the engagement boss 42a engaged with the process cartridge PPK of the fourth station. Subsequently, the coupling members include, in order from the front side, a second coupling member 43 including the engagement boss 43a of the third station, a third coupling member 44 including the engagement boss 44a of the second station, a fourth coupling member 45 including the engagement boss 45a of the first station, and a fifth coupling member 46. In addition, the second coupling member 43, the third coupling member 44, and the fourth coupling member 45 are members having the same shape. The tray side panel 41 has a shape constricted outward at an upper portion as compared with a lower portion. A space between the tray side panels 41L and 41R is wider at the upper portion, forms an inclined surface at an intermediate portion, and becomes narrower at the lower portion. A positioning member for the engagement portion 41Ra and the coupling member of the cartridge tray 40 is provided at the lower portion, and the upper portion has a function of stopping the rotation of the coupling members 42 to 45 near the engagement bosses 42a to 45a. With such a shape, a left-right width of the cartridge tray 40 can be made smaller without impairing the insertability of the process cartridge PP. Thus, such a shape contributes to the downsizing of the image forming apparatus 100. In addition, the tray side panel 41 is bent in an L-shape on the lower side to secure the strength. The tray side panels 41 and the coupling members are fastened using screws, but a fastening method is not limited to this. For example, thermal caulking may be used. In addition, a configuration may be employed in which the first coupling member 42 and the fifth coupling member 46, and the tray side panels 41 are fastened, and the second coupling member 43, the third coupling member 44, and the fourth coupling member 45 that are provided therebetween are not fastened.

5. Pre-Exposure Unit

Subsequently, the pre-exposure unit 55 serving as a charge removing unit according to the first exemplary embodiment will be described. As illustrated in FIG. 5B, four light guides 57 are provided in the lower portion of the cartridge tray 40, and are provided on the first coupling member 42, the second coupling member 43, the third coupling member 44, and the fourth coupling member 45 with penetration through the tray guide member 47L. A tray guide member 47R is provided on the drive side.

Figure 6:
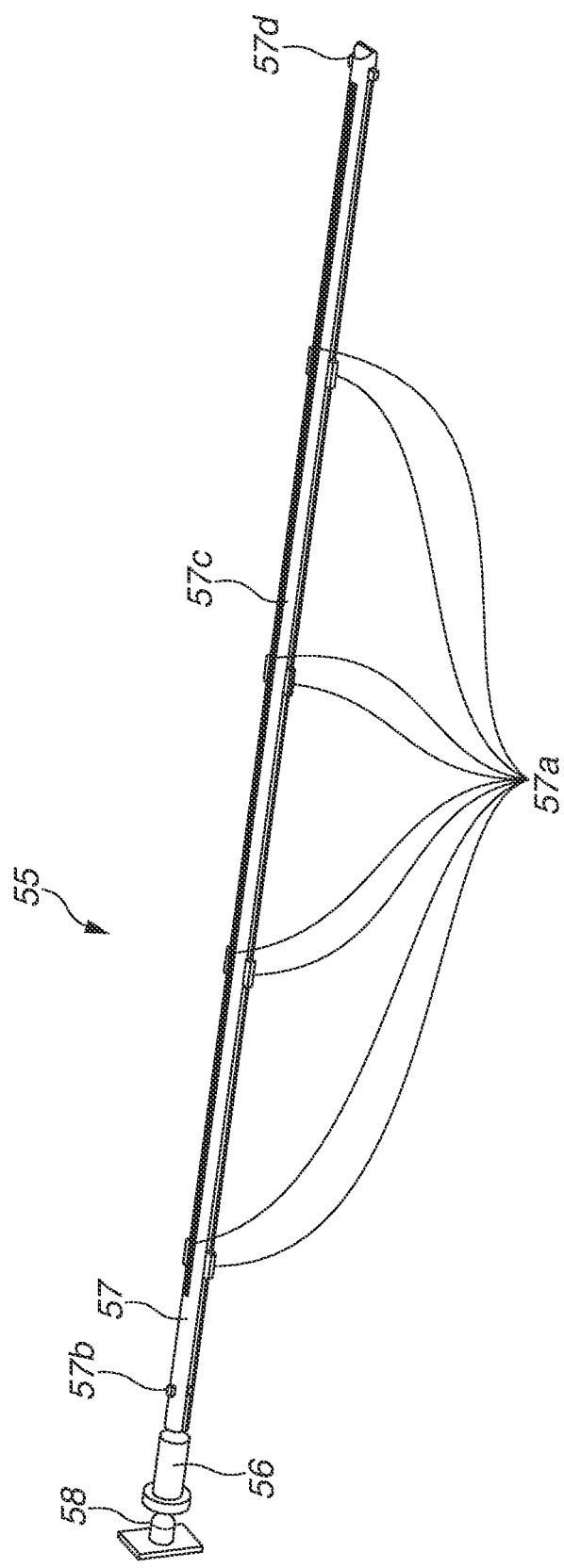
FIG. 6 is a perspective view of a light guide according to the first exemplary embodiment.

As illustrated in FIG. 6, a plurality of tabs 57a for providing ejector pins at the time of formation is provided on the light guide 57. The plurality of tabs 57a also has a function of positioning the light guide 57 with respect to the cartridge tray 40, and preventing the light guide 57 from being attached in a reverse orientation. In addition, the light guide 57 includes a rib 57b with an inclined portion, and a phase in a rotational direction can be determined in attaching the light guide 57 to the cartridge tray 40. Light emitted from a light source 58 being a light emitting unit such as a light-emitting diode (LED) that is provided on the non-drive side of the image forming apparatus 100 enters the light guide 57 via a sub light guide 56 provided on the main body side. Then, the light is uniformly dispersed by a Fresnel portion 57c formed inside the light guide 57. The pre-exposure unit 55 has a function of removing charge to change a surface potential formed on the surface of the photosensitive drum 1 before the surface of the photosensitive drum 1 is charged by the charging roller 2, to a predetermined surface potential, and stabilizing the surface potential, by emitting the light dispersed by the Fresnel portion 57c, onto the surface of the photosensitive drum 1. In the Fresnel portion 57c, shallow mound shapes having a vertex angle of about 114 degrees are consecutively arranged on a surface opposite of the side facing the photosensitive drum 1, at pitches of about 0.7 mm inclined by 80 degrees with respect to the axial direction. In addition, the width of the Fresnel portion 57c varies between the light entrance side provided at one end portion and another end portion on the opposite side of the light entrance side. The one end portion and the another end portion are also referred as the light end portion and the reflecting end portion, respectively. In the first exemplary embodiment, the Fresnel portion 57c has a shape having the width of 0.8 mm in a portion from the light entrance side to a central portion, and having the width changing from 0.8 mm to 1.7 mm from the central portion to the opposite side. In a state in which the process cartridge PP is positioned with respect to the cartridge tray 40, a clearance between the surface of the light guide 57 and the surface of the photosensitive drum 1 is about 5.6 mm. In addition, the light guide 57 is formed of a transparent material such as acrylic, but the material is not limited as long as the material is transparent. In the first exemplary embodiment, while the light entrance side is set as the non-drive side, the light entrance side may be set as the drive side. The light emitting unit is not limited to an LED, and an element such as a laser diode may be used.

Figure 7:
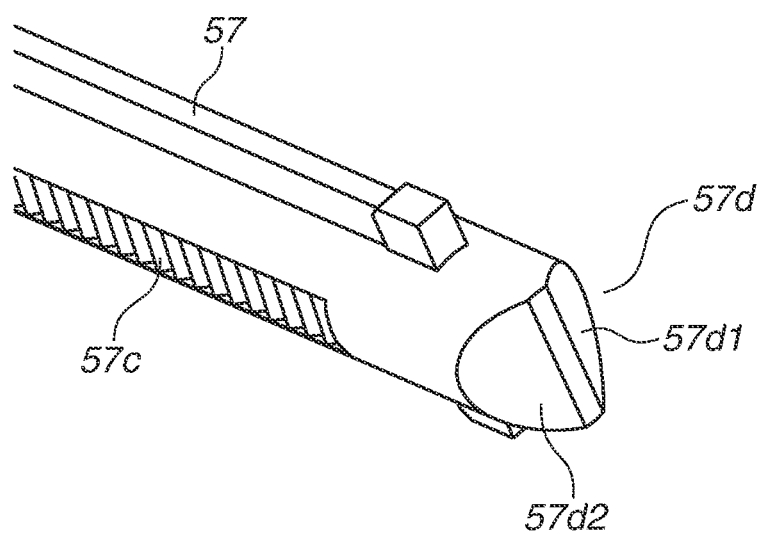
FIG. 7 is an enlarged view of a light guide end portion according to the first exemplary embodiment.

Next, the shape of the light guide 57 will be described with reference to FIGS. 6 and 7. FIG. 7 illustrates the configuration of the end portion of the light guide 57. As illustrated in FIGS. 6 and 7, the light guide 57 according to the first exemplary embodiment has a cylindrical shape with a diameter of about 4 mm, and the end portion includes an inclined portion 57d including two facing inclined surfaces 57*d*1 and 57*d*2. In the first exemplary embodiment, for mold injection, a symmetric face of the two inclined surfaces 57*d*1 and 57*d*2 is parallel to the tab 57*a* in consideration of mold removability, but the symmetric face needs not be always parallel to the tab 57*a*. The two inclined surfaces 57*d*1 and 57*d*2 are inclined surfaces intersecting in the longitudinal direction of the light guide 57, and forming an angle of about 45°. By light entering from the one end, which is the light entrance side, being reflected by the inclined portion 57*d* formed at the other end, it is possible to suppress the loss of light as compared with a vertical end surface. When the material of the light guide 57 is acrylic, a refractive index is about 1.49. Thus, when an optimum angle B of acrylic is calculated based on the refractive index, sin B=1/1.49=0.671 is obtained, and an angle A of the inclined portion 57*d* is desirably equal to or larger than an optimum angle B of about 43°. When light entering toward the other end is reflected by a wall at the end portion, it is desirable that a region totally reflecting light has a larger area. In other words, by forming the light guide 57 in such a manner that the largest amount of light is reflected at the other end portion, light emission efficiency with respect to the photosensitive drum 1 is enhanced. Especially when light is transmitted through the other end portion, an amount of light emitted to the photosensitive drum 1 near the other end portion might decline. Nevertheless, by employing the configuration according to the first exemplary embodiment, an absolute value of the surface potential of the photosensitive drum 1 near the other end portion can be made smaller.

Figure 8:
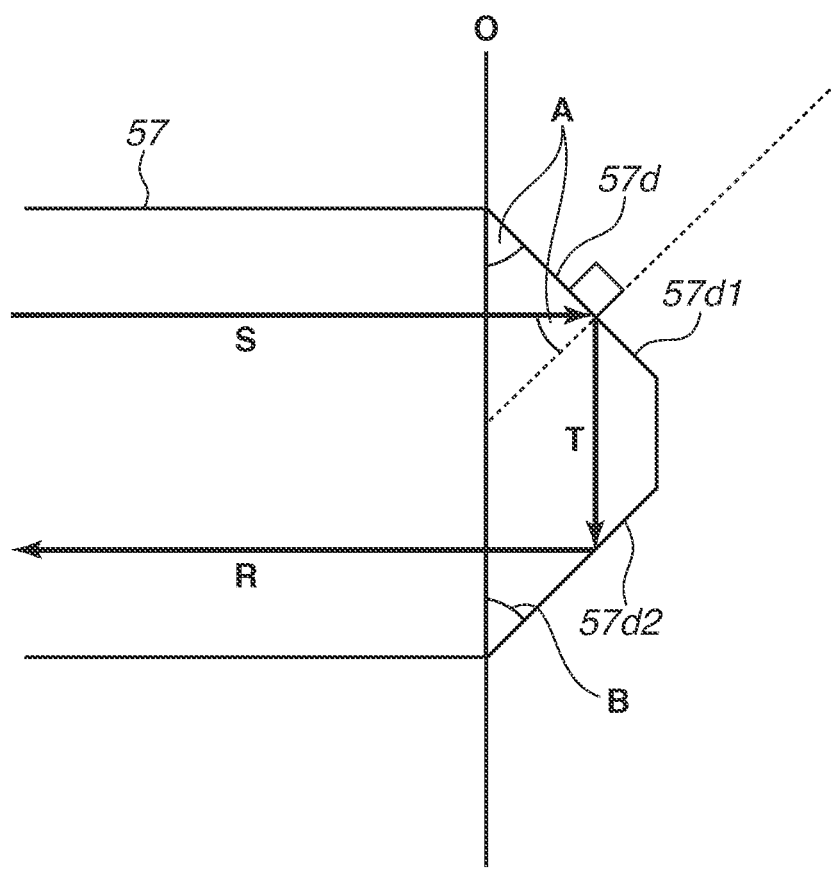
FIG. 8 is an enlarged view illustrating a state of light at an end portion of the light guide according to the first exemplary embodiment.

FIG. 8 illustrates a state of light reflection at the other end portion when the configuration according to the first exemplary embodiment is employed. FIG. 8 is a cross-sectional view illustrating a cross section of the light guide 57 cut in a direction orthogonal to the longitudinal direction of the light guide 57. Light entering from the one end portion and going straight ahead toward the other end portion in a direction indicated by the arrow S is nearly-totally reflected in the arrow T direction illustrated in FIG. 8, by the first inclined surface 57*d*1 provided at the other end portion. This is because an angle A formed by the first inclined surface 57*d*1 according to the first exemplary embodiment and a line segment O intersecting in the longitudinal direction is about 45°, and is equal to or larger than the optimum angle of 43°. The light reflected by the first inclined surface 57*d*1 goes straight ahead toward the second inclined surface 57*d*2 facing the first inclined surface 57*d*1. Then, the light that has travelled straight ahead is nearly-totally reflected in the arrow R direction illustrated in FIG. 8, by the second inclined surface 57*d*2. This is because an angle B formed between the second inclined surface 57*d*2 according to the first exemplary embodiment, and the line segment O intersecting in the longitudinal direction is about 45°, and an incidence angle of reflected light accordingly is about 45° as well. The light is therefore totally reflected again because the angle is equal to or larger than the optimum angle of 43°. Then, the light reflected by the second inclined surface 57*d*2 goes straight ahead toward the one end portion from the reflecting end portion. Because the light is emitted onto the photosensitive drum 1, such a configuration contributes to an increase in surface light on the photosensitive drum 1. In the first exemplary embodiment, both of the angles A and B respectively formed by the first inclined surface 57*d*1 and the second inclined surface 57*d*2, and the line segment O intersecting in the longitudinal direction are about 45°. Nevertheless, as described above, as long as the angles A and B are equal to or larger than the optimum angle of 43°, light going straight ahead toward the other end portion can be totally reflected. Thus, incident light is totally reflected at the other end portion on the condition that, in the direction orthogonal to the longitudinal direction, the angle A formed by the line segment O intersecting with the first inclined surface 57*d*1 and the second inclined surface 57*d*2, and the first inclined surface 57*d*1, and the angle B formed by the line segment O and the second inclined surface 57*d*2 satisfy the ranges defined by the following formulae (1) and (2):

$$43° < A < 90° \tag{1}$$

$$43° < B < 90° \tag{2}$$

Furthermore, even if the angle A or B falls below the optimum angle of 43°, by the angle A or B increasing from 0° to 43°, reflection efficiency increases. It is therefore possible to increase reflection efficiency as compared with the conventional art by the angles A and B satisfying the ranges defined by the following formulae (3) and (4):

$$0° < A < 90° \tag{3}$$

$$0° < B < 90° \tag{4}$$

As in the configuration according to the first exemplary embodiment, by setting both of the angles A and B respectively formed by the first inclined surface 57*d*1 and the second inclined surface 57*d*2, and the line segment O intersecting in the longitudinal direction to about 45°, it becomes possible to cause light having been once reflected by an inclined surface, to be reflected again by a facing inclined surface. This is because, if light going straight ahead reaches an end surface at the another end portion from an orthogonal direction, an incidence angle and a reflection angle both become 45°. When both of an incidence angle and a reflection angle of light reaching the other end portion are larger than the optimum angle of 43°, the light can be reflected toward the one end portion most efficiently. It is therefore desirable that the angles A and B respectively formed by the first inclined surface 57*d*1 and the second inclined surface 57*d*2, and the line segment O intersecting in the longitudinal direction are set to satisfy the ranges defined by the following formulate (5) and (6) because light can be totally reflected from the other end portion toward the one end portion most efficiently:

$$43° < A < 47° \tag{5}$$

$$43° < B < 47° \tag{6}$$

6. Drum Ghost

A surface potential formed on the surface of the photosensitive drum 1 changes by performing an image forming process. In particular, the surface potential changes by performing a latent image process, a charging process, and a transfer process. The surface potential formed on the photosensitive drum 1 is affected by the magnitude of electricity discharged in processes involving discharge, such as the above-described charging process and transfer process, and also affected by a surface potential formed before electricity is discharged. More specifically, for forming an image onto the recording material S, when an image-formed portion (bright portion potential: V1 region) in which a toner image is to be formed, and a non-image-formed portion (dark portion potential: Vd region) in which a toner image is not to be formed are formed on the surface of the photosensitive drum 1, a difference is generated between the surface states of the both portions after transfer. If electricity is discharged by the charging roller 2 in this state, a difference in surface potential is sometimes generated after charging. Because a transfer voltage applied to the primary transfer roller 17 during image formation has a positive polarity being a reverse polarity of the surface potential formed on the photosensitive drum 1, residual charge with a positive polarity is generated on the surface of the photosensitive drum 1. An amount of the residual charge varies depending on the surface potential of the photosensitive drum 1. Thus, even if the same surface potential can be formed in a region corresponding to the image-formed portion and a region corresponding to the non-image-formed portion, by the discharge in charging, when the latent image process and the development process are performed after time elapses, an absolute value of the surface potential sometimes decreases due to the residual charge.

If a toner image is once formed, after the toner image is transferred and toner is cleaned by the cleaning member 6, a potential at which the image is formed remains on the outer circumference surface of the photosensitive drum 1. Thus, a residual image of the previously-formed image is generated as a history on an image subsequently formed on the outer circumference surface of the photosensitive drum 1. The phenomenon will be referred to as a drum ghost. Specifically, in the phenomenon, a potential difference between the image-formed portion and the non-image-formed portion of a history image remaining on the outer circumference surface of the photosensitive drum 1 after image formation corresponding to the first rotation remains even during the image formation corresponding to the second rotation, and the shading of the history image appears on an image corresponding to the second rotation that is to be output onto a transfer material S.

The drum ghost is considered to occur in the following process. When the charging process, the latent image process, the development process, and the transfer process that are performed while the photosensitive drum 1 rotates once are defined as an image forming process of one cycle, a potential difference remains on the surface of the photosensitive drum 1 after an image forming process of the first cycle ends. The potential difference of the first cycle remains without completely disappearing even when the surface of the photosensitive drum 1 is uniformly charged by the charging roller 2 in the second cycle. Consequently, the surface of the photosensitive drum 1 is not uniformly charged, and the potential difference remaining after the charging sometimes remains without disappearing even after exposure. Thus, the potential does not become uniform because the influence of the potential difference in the first cycle remains in an electrostatic latent image formed after the surface of the photosensitive drum 1 is exposed in the second cycle. When the electrostatic latent image formed on the outer circumference surface of the photosensitive drum 1 in the second cycle is developed, an amount of toner adhering to the non-image-formed portion varies depending on the remaining potential difference in the first cycle. In other words, although a toner image is to be uniformly formed in the second cycle, the toner image includes a portion with a large toner amount and a portion with a small toner amount due to the influence of the potential difference of the electrostatic latent image in the first cycle. Thus, shading is also generated in a toner image transferred onto the intermediate transfer belt 13 due to a difference in toner amount, and shading with a dark color portion and a light color portion is also generated in an image finally formed on the transfer material S. The mechanism of the drum ghost will be specifically described below.

In view of the foregoing, in the first exemplary embodiment, for cancelling the potential difference generated on the photosensitive drum 1, and preventing the occurrence of a drum ghost, the above-described pre-exposure unit 55 is arranged. The pre-exposure unit 55 has a function of exposing the surface of the photosensitive drum 1 before the photosensitive drum 1 passes the primary transfer nip portion T1 and reaches a contact portion with the charging roller 2. By arranging the pre-exposure unit 55, even if a surface charge state is different between the image-formed portion and the non-image-formed portion of the photosensitive drum 1, the charge is reset by the pre-exposure unit 55, and the charge on the surface of the photosensitive drum 1 is uniformly removed. By charge on the surface of the photosensitive drum 1 being uniformly removed, potential formation on the photosensitive drum 1 is uniformly performed by the charging roller 2. This can prevent a drum ghost from occurring on the photosensitive drum 1.

Figure 9A:
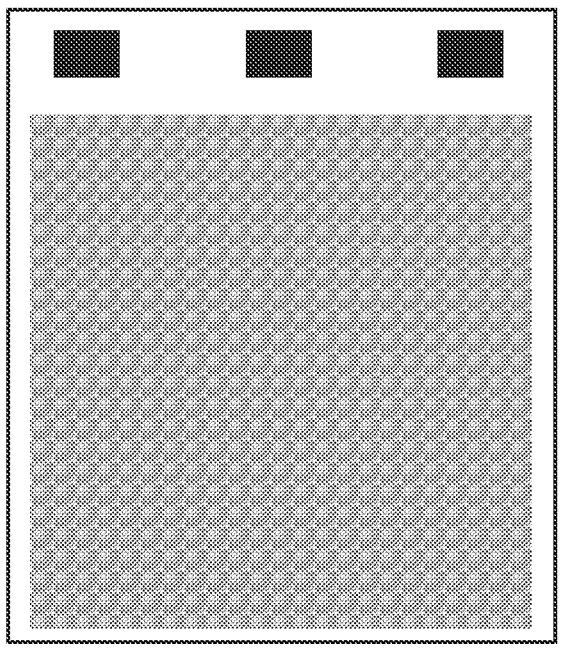
FIGS. 9A and 9B are diagrams illustrating a drum ghost image according to the first exemplary embodiment.
Figure 9B:
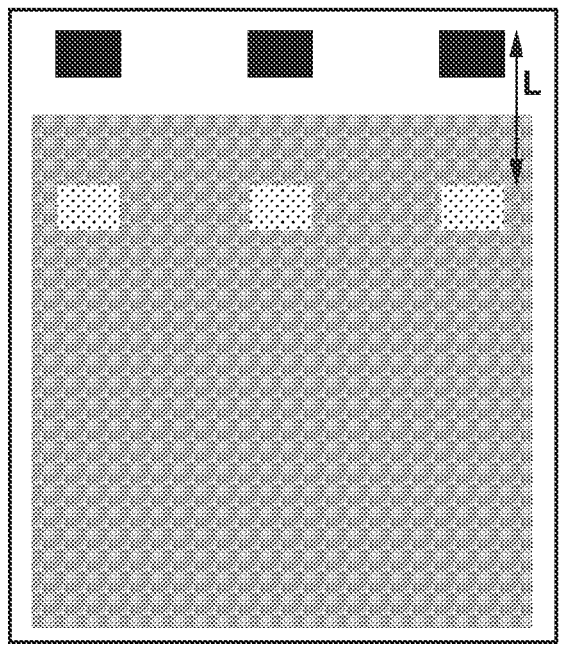

An image to be actually formed when a drum ghost occurs will be described. If an image as illustrated in FIG. 9A is output in a state in which the photosensitive drum 1 is set to the image forming apparatus 100 and the surface potential of the photosensitive drum 1 is adjusted, an image defect as illustrated in FIG. 9B is sometimes generated. This is an image defect attributed to a drum ghost that appears after one rotation of the photosensitive drum 1, which corresponds to a length L from a printed solid black patch end illustrated in FIG. 9B, and becomes prominent especially in a high-temperature and humidity environment. Specifically, the image defect is a phenomenon in which, when a part of an image portion in which a solid black patch is printed contributes to image formation again, a desired surface potential fails to be formed on the photosensitive drum 1 and the density changes.

The occurrence mechanism of a drum ghost in an image will be described in detail below.

Figure 10:
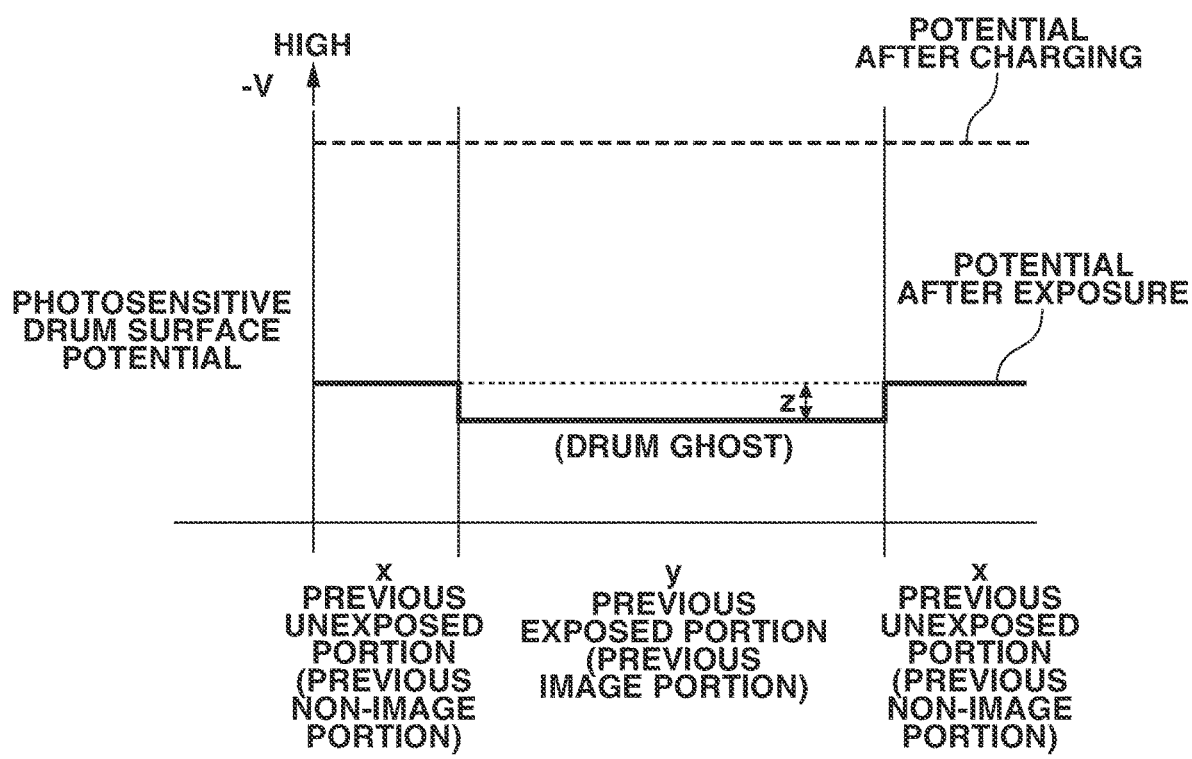
FIG. 10 is a diagram illustrating an occurrence mechanism of a drum ghost according to the first exemplary embodiment.

As described above, a drum ghost sometimes occurs due to a potential difference generated when an exposed portion and an unexposed portion on the photosensitive drum 1 are charged in the next charging process. In the portion exposed in the previous process, a potential difference is generated in the next charging process due to the influence of residual charge. The state is illustrated in FIG. 10. FIG. 10 illustrates a relationship between the surface potential of the photosensitive drum 1 and a position in the longitudinal direction, and illustrates surface potentials of the photosensitive drum 1 that are obtainable when an exposed portion and an unexposed portion in the axial direction of the photosensitive drum 1 are charged again and exposed again. As illustrated in FIG. 10, when the photosensitive drum 1 is exposed again in the exposure process, a difference (indicated by "z" in FIG. 10) in potential is generated after exposure between a portion exposed in the previous process (previous image-formed portion y) and an unexposed portion (previous non-image-formed portion x). More specifically, a potential difference between the previous image-formed portion y printed before one rotation of the photosensitive drum 1, and the previous non-image-formed portion x that has not been printed before one rotation of the photosensitive drum 1 remains on the photosensitive drum 1 even during the next image formation. If the potential difference becomes larger, a drum ghost being a density difference occurs in an image finally formed.

7. Effect of the Shape of the Light Guide

Subsequently, the effect of an end portion shape of the light guide 57 used in the pre-exposure unit 55 according to the first exemplary embodiment will be described.

In a high-temperature and high-humidity environment at the temperature of 30° C. and the humidity of 80%, the occurrence level of an image defect attributed to a ghost has been checked. The image illustrated in FIG. 9A has been used for the checking. A halftone portion having a halftone of an image portion and a non-image portion in the image illustrated in FIG. 9A is a halftone being uniform throughout the surface and having the density of 40%. The image is suitable for determining the quality of the ghost level. Using the image, comparison of ghost levels is performed using light guides created under the conditions described in the first exemplary embodiment and Comparative Example 1.

Figure 11:
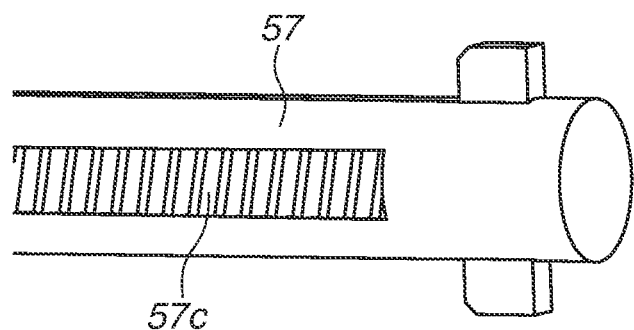
FIG. 11 is an enlarged view of a light guide end portion according to Comparative Example 1.

The light guide according to Comparative Example 1 is different in configuration of the reflecting end portion. While the other end portion includes the two facing inclined portions 57d1 and 57d2 as illustrated in FIG. 7 in the first exemplary embodiment, in Comparative Example 1, the other end portion includes a straight portion as illustrated in FIG. 11.

A table illustrated in FIG. 20 lists results obtained by outputting images in the respective conditions, and a rate of a surface light amount of the photosensitive drum 1 at the other end portion when a surface light amount of the photosensitive drum 1 at the one end portion of the light guide 57 is set to 100%. Ghost levels are ranked by visual check. In particular, comparison is performed while focusing attention on a ghost level near the other end portion of the light guide 57. In the table, "o" indicates that the occurrence of a ghost has not been observed in an image, and "x" indicates that the occurrence of a ghost has been observed in an image.

As illustrated in FIG. 20, in the configuration according to the first exemplary embodiment, the occurrence of a ghost has been prevented. This is because a decrease rate of a surface light amount of the photosensitive drum 1 at the other end portion with respect to a surface light amount of the photosensitive drum 1 at the one end portion being the light source 58 side is small, and the surface potential of the photosensitive drum 1 can be efficiently decreased even at the other end portion. It is desirable that a rate of the surface light amount of the photosensitive drum 1 at the other end portion with respect to the surface light amount of the photosensitive drum 1 at the one end portion of the light guide 57 according to the first exemplary embodiment is set to about 60% or more.

On the other hand, in Comparative Example 1, a ghost image has been observed at the other end portion. This is because a decrease rate of a surface light amount of the photosensitive drum 1 at the other end portion is large, and accordingly, the surface potential of the photosensitive drum 1 at the another end portion cannot be sufficiently decreased. If a surface light amount on the photosensitive drum 1 is not sufficient, the influence of residual charge remaining on the surface of the photosensitive drum 1 cannot be sufficiently removed. It is accordingly inferred that a ghost image has occurred at the other end portion.

Figure 12:
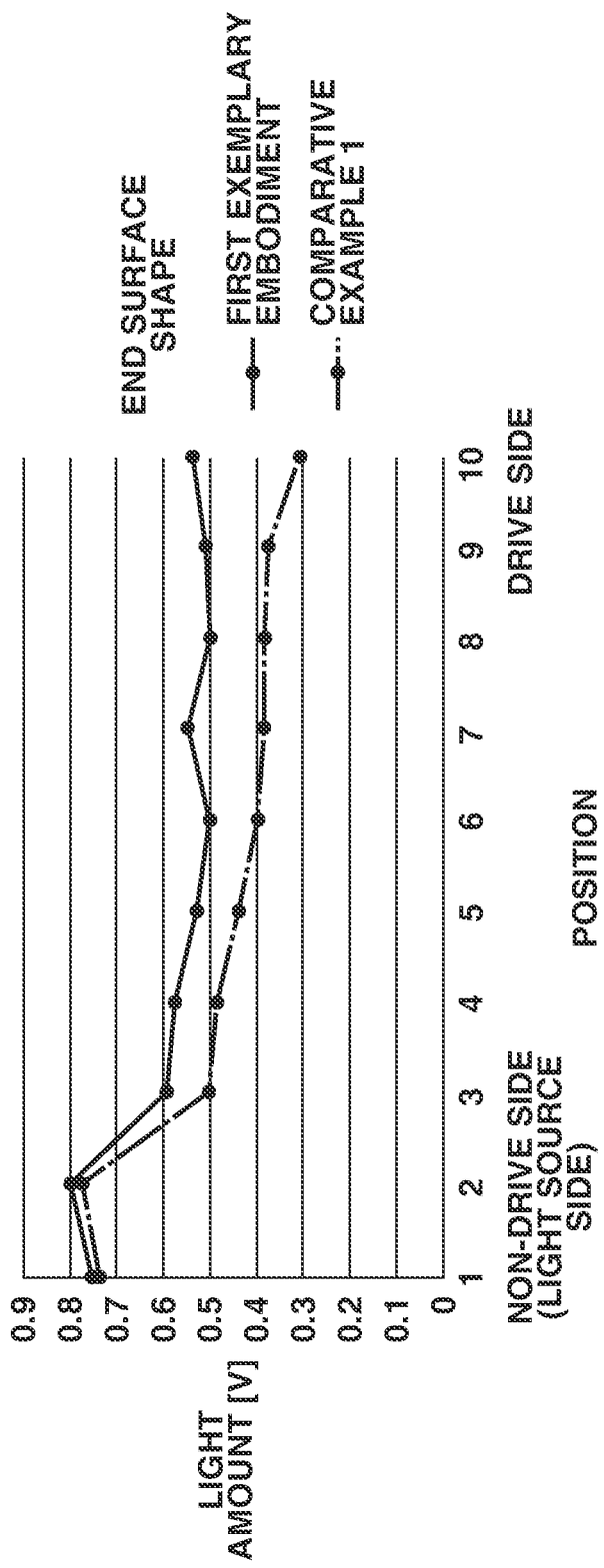
FIG. 12 illustrates a photosensitive drum surface light amount distribution in a longitudinal direction according to the first exemplary embodiment and Comparative Example 1.

FIG. 12 illustrates a surface light amount distribution of the photosensitive drum 1 in the axial direction of the photosensitive drum 1 according to the first exemplary embodiment and Comparative Example 1. As illustrated in FIG. 12, in the configuration according to the first exemplary embodiment, a surface light amount of the photosensitive drum 1 is uniform from the center of the photosensitive drum 1 to the other end portion, and a decline in a surface light amount at the other end portion is hardly observed. On the other hand, in the configuration according to Comparative Example 1, a decline in a surface light amount toward the other end portion is observed, and a decline in surface light amount is prominent especially at the other end portion. As illustrated in FIG. 20, rates of surface light amounts at the other end portion of the photosensitive drum 1, with respect to surface light amounts at the one end portion of the photosensitive drum 1 have been 71.6% in the first exemplary embodiment and 42.4% in Comparative Example 1. The results are reflected in the ghost levels. Furthermore, when surface light amount profiles according to the first exemplary embodiment and Comparative Example 1 in FIG. 12 are compared, it can be seen that, over the entire region in the longitudinal direction, the surface light amount according to the first exemplary embodiment is generally larger than that according to Comparative Example 1. This is because, in the first exemplary embodiment, by light emitted from the light source 58 being reflected at the other end portion toward the central portion due to the shape of the other end portion, a light amount decline over the entire region in the longitudinal direction is suppressed. This accordingly means that, in the first exemplary embodiment, an amount of light emitted from the light source 58 can be made smaller as compared with Comparative Example 1. This leads to a reduction in power consumption.

The image forming apparatus 100 according to the first exemplary embodiment includes the photosensitive drum 1, and the pre-exposure unit 55 that emits light onto the surface of the photosensitive drum 1 for removing charge on the surface of the photosensitive drum 1. The pre-exposure unit 55 includes the light source 58 for emitting light onto the surface of the photosensitive drum 1, and the light guide 57 that guides light so as to irradiate the surface of the photosensitive drum 1 with the light emitted from the light source 58. For example, the light guide 57 that guides light from the light source 58 to the surface of the photosensitive drum 1. That is, the light guide 57 is arranged in a light path located between the light source 58 and the surface of the photosensitive drum 1. The light guide 57 extends in the axial direction of the photosensitive drum 1, and has a cylindrical shape. An end portion being an end portion of the light guide 57 in the axial direction of the light guide 57, and being an end portion to which light emitted by the light source 58 is introduced is called the one end portion. At the other end portion on the opposite side of the one end portion, inclined surface 57d inclining in a direction from the one end portion to the another end portion toward the central axis of the circumference of the light guide 57 in a cross section orthogonal to the longitudinal direction is included.

In addition, the inclined portion 57d includes the first inclined surface 57d1 and the second inclined surface 57d2. The inclined portion 57d inclines in such a manner that a width in the widthwise direction orthogonal to the longitudinal direction of the light guide 57 becomes narrower toward an end surface of the light guide 57 at the another end portion. In addition, the first inclined surface 57d1 and the second inclined surface 57d2 are arranged to face each other in the widthwise direction.

In addition, a configuration of forming the other end portion in such a manner that, in a cross section orthogonal to the axial direction of the light guide 57, a diameter of a circle formed by the first inclined surface 57d1 and the second inclined surface 57d2 becomes smaller toward the end surface at the other end portion is included.

In other words, the idea of the configuration according to the first exemplary embodiment is to form the light guide 57 in such a manner that light entering from the one end portion and going straight ahead toward the other end portion goes straight ahead from the other end portion toward the one end portion by being reflected by the other end portion.

From the above-described result, in the configuration in which the light guide 57 is provided in the pre-exposure unit 55, it is possible to suppress a light amount decline at an end portion on the opposite side of an input side of light.

Figure 13:
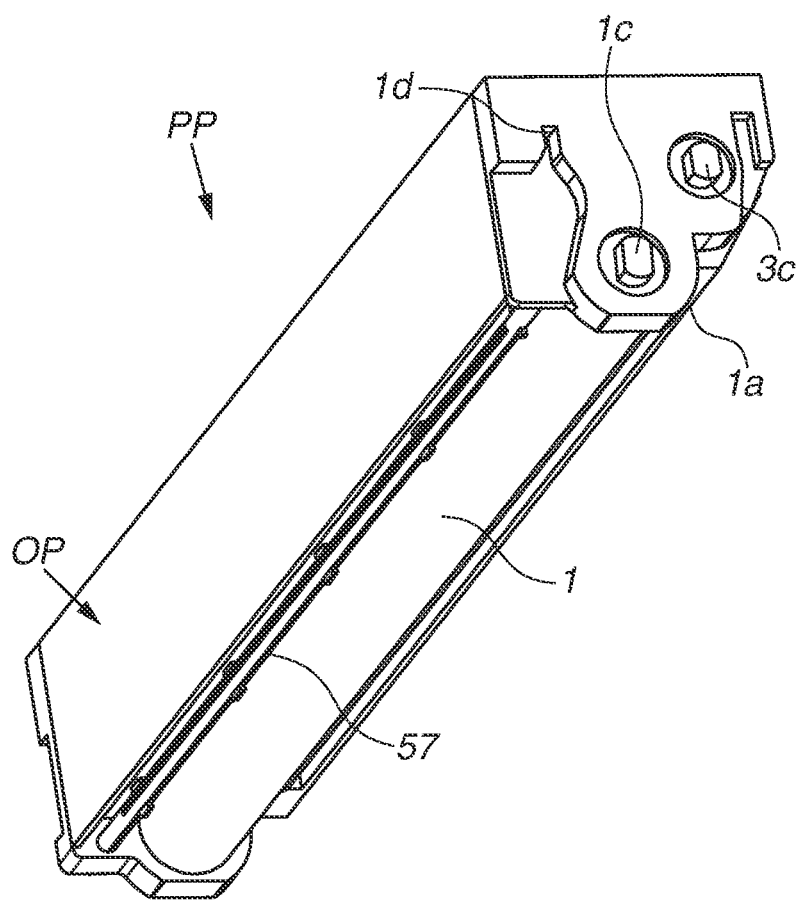
FIG. 13 is a perspective view of a cartridge of an image forming apparatus according to the first exemplary embodiment.

In addition, the light guide 57 according to the first exemplary embodiment is included in the cartridge tray 40. Nevertheless, the present disclosure is not limited to this. For example, as illustrated in FIG. 13, the light guide 57 may be included in the process cartridge PP.

In addition, in the first exemplary embodiment, the light guide 57 has a cylindrical shape including a cylinder, but the light guide 57 may be a prismatic column such as a triangular prism or a quadrangular prism.

Figure 14:
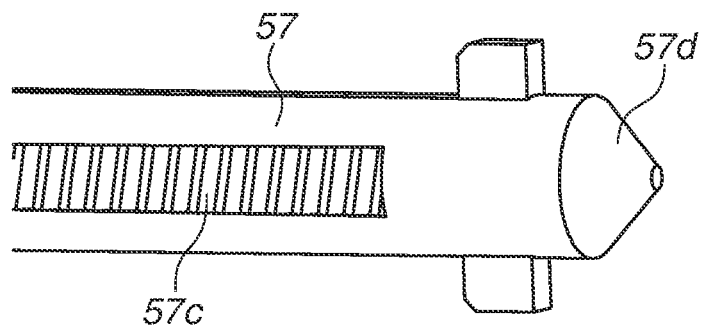
FIG. 14 is an enlarged view of a light guide end portion according to a modified example of the first exemplary embodiment.
Figure 15:
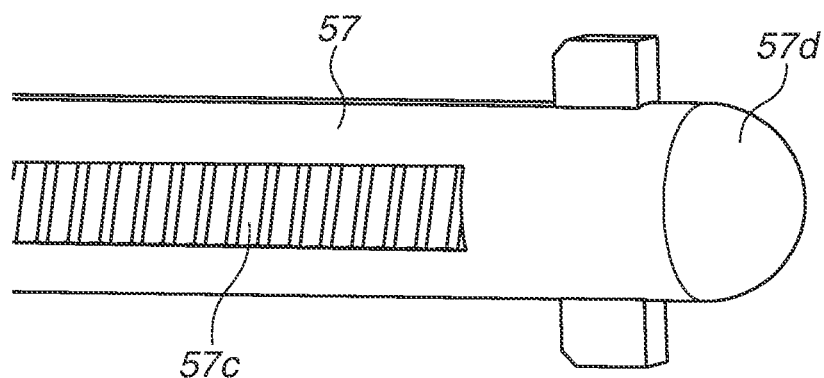
FIG. 15 is an enlarged view of a light guide end portion according to a modified example of the first exemplary embodiment.
Figure 16:
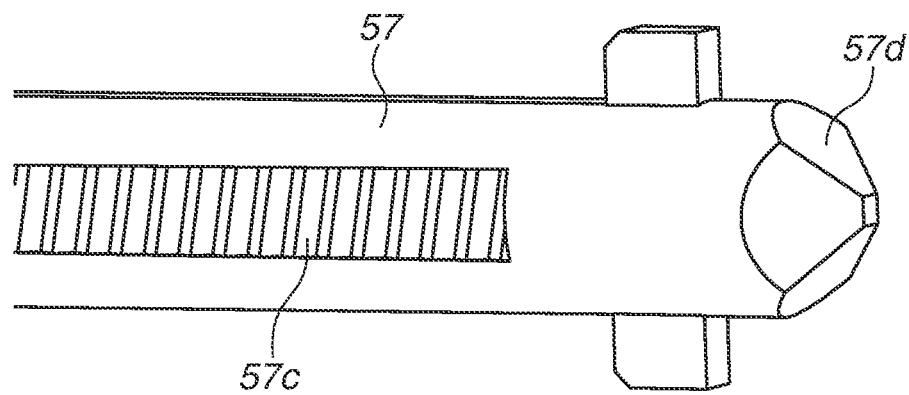
FIG. 16 is an enlarged view of a light guide end portion according to a modified example of the first exemplary embodiment.
Figure 17:
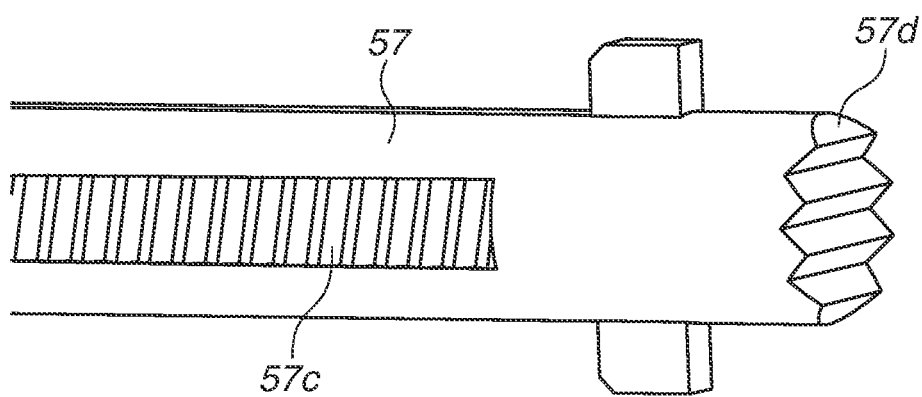
FIG. 17 is an enlarged view of a light guide end portion according to a modified example of the first exemplary embodiment.

A modified example according to the present disclosure will be described. In the first exemplary embodiment, the shape of the other end portion of the light guide 57 includes the two facing inclined surfaces 57d1 and 57d2. Nevertheless, the present disclosure is not limited to this. For example, the shape of the other end portion may be a circular cone shape as illustrated in FIG. 14, or may be a convex curve shape such as a hemisphere shape as illustrated in FIG. 15. In addition, in place of the facing two surfaces, the shape of the other end portion may include three or more surfaces such as four surfaces as illustrated in FIG. 16, and need not have a symmetrical shape. The angles A and B of the inclined surfaces need not be always 45°. Alternatively, as illustrated in FIG. 17, the other end portion may have a shape in which recess portions and protruding portions are alternately provided, or may be a shape in which circular cones or pyramids are arranged.

In any of the above-described configurations, the occurrence of a ghost at the other end portion is prevented. This is because a decrease rate of a surface light amount of the photosensitive drum 1 at the other end portion with respect to a surface light amount of the photosensitive drum 1 at the one end portion being the light source 58 side is small, and the potential surface of the photosensitive drum 1 can be efficiently decreased even at the other end portion.

In a configuration of an image forming apparatus 100 applied in a second exemplary embodiment, members that are the same as those in the first exemplary embodiment are assigned the same reference numerals, and the description will be omitted.

Figure 18:
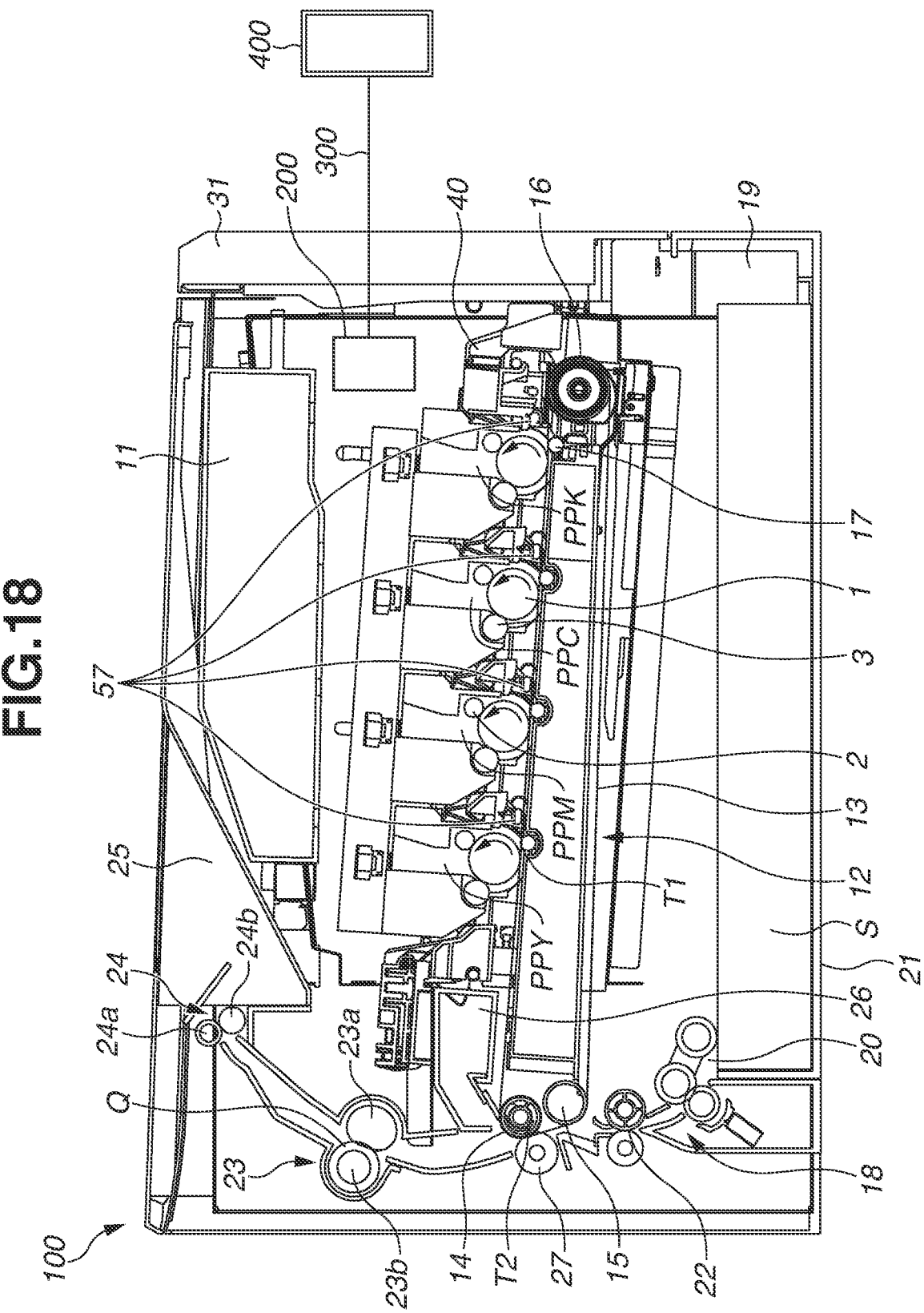
FIG. 18 is a cross-sectional view of an image forming apparatus according to a second exemplary embodiment.

The image forming apparatus 100 according to the second exemplary embodiment, that is illustrated in FIG. 18, employs a cleaner-less system.

1. Cleaner-Less System

A phenomenon occurring in an operation of each process cartridge PP when the cleaner-less system according to the second exemplary embodiment is employed will be described with reference to FIGS. 19A to 19E. As illustrated in FIG. 19A, after a toner image developed on the photosensitive drum 1 is primarily transferred onto the intermediate transfer belt 13, toner that has not been primarily transferred partially remains on the photosensitive drum 1 as primary transfer residual toner. When the cleaning member 6 is provided, the primary transfer residual toner is collected by the cleaning member 6. Nevertheless, in the case of the cleaner-less system, as illustrated in FIG. 18, there is no cleaning device that collects primary transfer residual toner. Thus, without being cleaned, the toner on the photosensitive drum 1 reaches the charging roller 2 as-is as illustrated in FIG. 19A. The primary transfer residual toner reaching the charging roller 2 is regular polarity toner or reverse polarity toner with a small charge amount. As illustrated in FIG. 19B, these types of primary transfer residual toner are subjected to discharge by an electrical field generated by a charge voltage, at a void portion anterior to a contact portion (charging nip) between the charging roller 2 and the photosensitive drum 1, and charged to a negative polarity being a regular polarity being the same polarity as the photosensitive drum 1. Because primary transfer residual toner has a small charge amount, primary transfer residual toner is susceptible to discharge, and is likely to become toner with a negative polarity being a regular polarity, by the discharge. Thus, because a charge voltage becomes larger on the minus side than the surface potential of the photosensitive drum 1 at the charging nip, as illustrated in FIG. 19C, the primary transfer residual toner charged to a negative polarity does not adhere to the charging roller 2, and passes the charging roller 2. A part of toner with a reverse polarity that has not been subjected to discharge and reaches the charging roller 2 as-is is electrically attracted by the charging roller 2.

The primary transfer residual toner having passed the charging nip reaches a laser emission position in accordance with the rotation of the photosensitive drum 1. Because an amount of primary transfer residual toner is not so large as to shield laser light E from the exposure unit 11, the primary transfer residual toner does not affect a process of forming an electrostatic latent image onto the photosensitive drum 1, and reaches a contact portion (development nip) between the development roller 3 and the photosensitive drum 1. As illustrated in FIG. 19D, toner in an unexposed portion on the photosensitive drum 1 is electrically collected to the development roller 3 side in accordance with a potential relationship between the surface potential of the photosensitive drum 1 and a development voltage. In the second exemplary embodiment, a dark portion potential (Vd) of the photosensitive drum 1 is set to −550 V, and a development voltage is set to −400 V. In FIG. 19E, toner in an exposed portion on the photosensitive drum 1 remains on the photosensitive drum 1 without being collected by the development roller 3, in accordance with a potential relationship between the surface potential of the photosensitive drum 1 and a development voltage. In the second exemplary embodiment, a bright portion potential (Vl) of the photosensitive drum 1 is set to −140 V, and a development voltage is set to −400 V. Nevertheless, toner is electrically supplied also from the development roller 3 to the exposed portion on the photosensitive drum 1. Thus, together with the toner supplied from the development roller 3, the primary transfer residual toner is transferred again. A development voltage in the second exemplary embodiment is represented as a potential difference from an earth potential. Thus, the development voltage=−400 V is interpreted as having a potential difference of −400 V by a development voltage applied to the core metal of the development roller 3, with respect to the earth potential (0 V). The same applies to a charge voltage and a transfer voltage, which will be described below.

In this manner, primary transfer residual toner remaining on the photosensitive drum 1 without being transferred onto the recording material S or the intermediate transfer belt 13 is collected by the development device 4 in an unexposed portion, and in an exposed portion, the primary transfer residual toner is transferred from the photosensitive drum 1 together with newly-developed toner. The toner collected by the development device 4 is mixed with toner in the development device 4, and is used. Thus, in each cartridge, toner of a corresponding color can be effectively utilized.

In the cleaner-less configuration, for causing the development device 4 to collect primary transfer residual toner, it is necessary to control the charge of primary transfer residual toner. At this time, by utilizing the discharge of the charging roller 2 and the photosensitive drum 1, the charge of primary transfer residual toner is changed to a regular polarity. For changing the charge to a regular polarity, it is effective to sufficiently perform discharge between the charging roller 2 and the photosensitive drum 1. It is therefore desirable to use the pre-exposure unit 55 as a unit that increases discharge.

Thus, when the light guide 57 described in the first exemplary embodiment is applied to the cleaner-less configuration according to the second exemplary embodiment, primary transfer residual toner can be charged to a regular polarity uniformly in the longitudinal direction. As a result, primary transfer residual toner can be collected by the development device 4 uniformly in the longitudinal direction.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-175901, filed Sep. 26, 2019 which is hereby incorporated by reference herein in its entirety.

What is claimed is:

1. An image forming apparatus comprising:
an image bearing member that is rotatable; and
a charge removing unit configured to emit light onto a surface of the image bearing member for removing charge on the surface of the image bearing member,
wherein the charge removing unit includes a light source configured to emit the light and a light guide,
wherein the light guide (i) is configured to guide the light to irradiate the surface of the image bearing member with the light, (ii) has a cylindrical shape extending in an axial direction of the image bearing member, (iii) includes a first projection portion projecting from the light guide outward in an axial direction of the light guide, and (iv) includes a second projection which is disposed on a side opposite of the first projection portion with respect to a central axis of a circumference of the light guide projecting from the light guide outward in the axial direction of the light guide,
wherein the light guide further includes a first end portion, which is an end portion to which the light emitted by the light source is introduced, and includes a second end portion in a longitudinal direction of the light guide,
wherein the second end portion is an end portion disposed on a side opposite of the first end portion in the longitudinal direction of the light guide, and the second end portion includes an inclined surface inclining in a direction from the first end portion to the second end portion, toward the central axis of the circumference of the light guide,
wherein the inclined surface includes a first inclined surface and a second inclined surface facing the first inclined surface in a widthwise direction of the light guide orthogonal to the longitudinal direction of the light guide, and
wherein, when a surface in which the first inclined surface and the second inclined surface are symmetrical is defined as a symmetry surface, a projecting direction of the first projection portion is parallel to the symmetry surface.

2. The image forming apparatus according to claim 1, wherein, in a cross section orthogonal to the longitudinal direction of the light guide, a diameter of a circle formed by the inclined surface becomes smaller toward an end surface of the second end portion.

3. The image forming apparatus according to claim 1, wherein, in the widthwise direction of the light guide, an angle A formed by a line segment intersecting with the first inclined surface and the second inclined surface, and the first inclined surface, and an angle B formed by the line segment and the second inclined surface satisfy ranges defined as 43°<A<90° and 43°<B<90°.

4. The image forming apparatus according to claim 1, wherein a shape of the second end portion of the light guide is a convex curve shape.

5. The image forming apparatus according to claim 4, wherein the convex curve shape is a hemisphere shape.

6. The image forming apparatus according to claim 1, wherein a shape of the second end portion of the light guide is a circular cone shape.

7. The image forming apparatus according to claim 1, further comprising a first light guide and a second light guide configured to introduce the light to the first light guide being the light guide,
wherein the second light guide is provided between the first light guide and the light source.

8. The image forming apparatus according to claim 1, further comprising:
an apparatus main body; and
a movable member configured to move between an internal position located on an inside of the apparatus main body, and an external position located on an outside of the apparatus main body, in a state of supporting a cartridge including the image bearing member,
wherein the light guide is included in the movable member.

9. The image forming apparatus according to claim 1, further comprising a cartridge detachably attached to an apparatus main body,
wherein the cartridge includes the light guide and the image bearing member.

10. The image forming apparatus according to claim 1, further comprising:
a development member configured to supply developer to the surface of the image bearing member; and
a transfer member configured to transfer, onto a transfer target material, the developer supplied by the development member,
wherein the development member collects developer remaining on the image bearing member and which was not transferred onto the transfer target material.

11. The image forming apparatus according to claim 10, wherein the developer is single-component developer.

12. The image forming apparatus according to claim 1,
wherein the light guide has a Fresnel portion dispersing the light for irradiating the image bearing member, and
wherein a width of the Fresnel portion in a direction perpendicular to the longitudinal direction of the light guide gradually increases from a center portion of the light guide toward the second end portion.

13. The image forming apparatus according to claim 12, wherein, when an end portion of the Fresnel portion located on the side in which the second end portion is disposed is defined as a third end portion, a width of the Fresnel portion in a direction orthogonal to the longitudinal direction of the light guide in the third end portion is widest among the Fresnel portion provided in the light guide.

14. An image forming apparatus comprising:
an image bearing member that is rotatable; and
a charge removing unit configured to emit light onto a surface of the image bearing member for removing charge on the surface of the image bearing member,
wherein the charge removing unit includes a light source configured to emit the light and a light guide,
wherein the light guide (i) is configured to guide the light to irradiate the surface of the image bearing member with the light, (ii) extends in an axial direction of the image bearing member, (iii) includes a first projection portion projecting from the light guide outward in an axial direction of the light guide, and (iv) includes a second projection which is disposed on a side opposite of the first projection portion with respect to a central axis of a circumference of the light guide projecting from the light guide outward in the axial direction of the light guide,
wherein the light guide further includes a first end portion, which is an end portion to which the light emitted by the light source is introduced, and includes a second end portion in a longitudinal direction of the light guide,
wherein the second end portion is an end portion disposed on a side opposite of the first end portion in the longitudinal direction of the light guide, and the second end portion include a first inclined surface and a second inclined surface inclining in such a manner that a width of the light guide in a widthwise direction of the light guide orthogonal to the longitudinal direction of the light guide becomes narrower toward an end surface of the light guide in the longitudinal direction of the light guide, and
wherein the first inclined surface and the second inclined surface are arranged to face each other in the widthwise direction of the light guide.

15. The image forming apparatus according to claim 14, wherein, in the widthwise direction of the light guide, an angle A formed by a line segment intersecting with the first inclined surface and the second inclined surface, and the first inclined surface, and an angle B formed by the line segment and the second inclined surface satisfy ranges defined as 43°<A<90° and 43°<B<90°.

16. The image forming apparatus according to claim 15, wherein the angle A satisfies a range defined as 43°<A<47°.

17. The image forming apparatus according to claim 16, wherein the angle B satisfies a range defined as 43°<B<47°.

18. The image forming apparatus according to claim 14, further comprising a second light guide configured to introduce the light to a first light guide being the light guide,
wherein the second light guide is provided between the first light guide and the light source.

19. The image forming apparatus according to claim 14, further comprising:
an apparatus main body; and
a movable member configured to move between an internal position located on an inside of the apparatus main body, and an external position located on an outside of the apparatus main body, in a state of supporting a cartridge including the image bearing member,
wherein the light guide is included in the movable member.

20. The image forming apparatus according to claim 14, wherein the light guide is included in a cartridge including the image bearing member and is detachably attached to an apparatus main body.

21. The image forming apparatus according to claim 14, further comprising:
a development member configured to supply developer to the surface of the image bearing member; and
a transfer member configured to transfer, onto a transfer target material, the developer supplied by the development member,
wherein the development member collects developer remaining on the image bearing member and which was not transferred onto the transfer target material.

22. The image forming apparatus according to claim 21, wherein the developer is single-component developer.

23. An image forming apparatus comprising:
an image bearing member that is rotatable; and
a charge removing unit configured to emit light onto a surface of the image bearing member for removing charge on the surface of the image bearing member,
wherein the charge removing unit includes a light source configured to emit the light and a light guide,
wherein the light guide (i) is configured to guide the light to irradiate the surface of the image bearing member, with the light, (ii) extends in an axial direction of the image bearing member, (iii) includes a first projection portion projecting from the light guide outward in an axial direction of the light guide, and (iv) includes a second projection which is disposed on a side opposite of the first projection portion with respect to a central axis of a circumference of the light guide projecting from the light guide outward in the axial direction of the light guide,
wherein the light guide further includes a first end portion, which is an end portion to which the light emitted by the light source is introduced, and includes a second end portion in a longitudinal direction of the light guide, and
wherein the second end portion is an end portion disposed on a side opposite of the first end portion in the longitudinal direction of the light guide, and the light guide is configured to guide the light entering from the first end portion and going straight toward the second end portion, and is configured to guide light reflected by the second end portion straight toward the first end portion.

24. The image forming apparatus according to claim 23, further comprising a first light guide and a second light guide configured to introduce the light to the first light guide being the light guide,
wherein the second light guide is provided between the first light guide and the light source.

25. The image forming apparatus according to claim 24, further comprising:
an apparatus main body; and
a movable member configured to move between an internal position located on an inside of the apparatus main body, and an external position located on an outside of the apparatus main body, in a state of supporting a cartridge including the image bearing member,
wherein the light guide is included in the movable member.

26. The image forming apparatus according to claim 24, wherein the light guide is included in a cartridge including the image bearing member and being detachably attached to an apparatus main body.

27. The image forming apparatus according to claim 24, further comprising:
a development member configured to supply developer to the surface of the image bearing member; and a transfer member configured to transfer, onto a transfer target material, the developer supplied by the development member, wherein the development member collects developer remaining on the image bearing member and which was not transferred onto the transfer target material.

28. The image forming apparatus according to claim 27, wherein the developer is single-component developer.

29. A cartridge comprising:

an image bearing member that is rotatable; and a light guide that (i) is configured to guide light to irradiate the surface of the image bearing member with the light for removing charge on the surface of the image bearing member, (ii) has a cylindrical shape extending in an axial direction of the image bearing member, (iii) includes a first projection portion projecting from the light guide outward in an axial direction of the light guide, and (iv) includes a second projection which is disposed on a side opposite of the first projection portion with respect to a central axis of a circumference of the light guide, wherein the light guide further includes a first end portion, which is an end portion to which the light emitted by a light source is introduced, and includes a second end portion in an axial direction of the light guide, wherein the second end portion is an end portion disposed on a side opposite of the first end portion in the axial direction of the light guide, and the second end portion includes an inclined surface inclining in a direction from the first end portion to the second end portion, toward the central axis of the circumference of the light guide, wherein the inclined surface includes a first inclined surface and a second inclined surface facing the first inclined surface in a widthwise direction of the light guide orthogonal to a longitudinal direction of the light guide, and wherein when a surface in which the first inclined surface and the second inclined surface are symmetrical is defined as a symmetry surface, a projecting direction of the first projection portion is parallel to the symmetry surface.

30. The cartridge according to claim 29, wherein the light guide has a Fresnel portion dispersing the light for irradiating the image bearing member, and wherein a width of the Fresnel portion in a direction perpendicular to the longitudinal direction of the light guide gradually increases from a center portion of the light guide toward the second end portion.

31. The cartridge according to claim 30, wherein, when an end portion of the Fresnel portion located on the side in which the second end portion is disposed is defined as a third end portion, a width of the Fresnel portion in a direction orthogonal to the longitudinal direction of the light guide in the third end portion is widest among the Fresnel portion provided in the light guide.

32. A cartridge comprising:

an image bearing member that is rotatable; and a light guide that (i) is configured to guide light to irradiate the surface of the image bearing member with the light for removing charge on the surface of the image bearing member, (ii) includes a first projection portion projecting from the light guide outward in an axial direction of the light guide, and (iii) includes a second projection which is disposed on a side opposite of the first projection portion with respect to a central axis of a circumference of the light guide projecting from the light guide outward in the axial direction of the light guide, wherein the light guide further includes a first end portion, which is an end portion to which the light emitted by the light source is introduced, and includes a second end portion in an axial direction of the light guide, wherein the second end portion is an end portion disposed on a side opposite of the first end portion in the axial direction of the light guide, and the second end portion include a first inclined surface and a second inclined surface inclining in such a manner that a width of the light guide in a widthwise direction of the light guide orthogonal to a longitudinal direction of the light guide becomes narrower toward an end surface of the light guide in the longitudinal direction of the light guide, and wherein the first inclined surface and the second inclined surface are arranged to face each other in the widthwise direction of the light guide.

* * * * *